US011100151B2

(12) United States Patent
Brockman et al.

(10) Patent No.: US 11,100,151 B2
(45) Date of Patent: Aug. 24, 2021

(54) INTERACTIVE PATENT VISUALIZATION SYSTEMS AND METHODS

(71) Applicant: Magic Number, Inc., Durham, NC (US)

(72) Inventors: Nathaniel Taylor Brockman, Mt. Pleasant, SC (US); JiNan Glasgow George, Durham, NC (US)

(73) Assignee: MAGIC NUMBER, INC., Durham, NC (US)

( * ) Notice: Subject to any disclaimer, the term of this patent is extended or adjusted under 35 U.S.C. 154(b) by 180 days.

(21) Appl. No.: 16/242,220

(22) Filed: Jan. 8, 2019

(65) Prior Publication Data

US 2019/0213208 A1 Jul. 11, 2019

Related U.S. Application Data

(60) Provisional application No. 62/614,737, filed on Jan. 8, 2018.

(51) Int. Cl.
| | |
|---|---|
| *G06F 16/00* | (2019.01) |
| *G06F 16/34* | (2019.01) |
| *G06Q 30/02* | (2012.01) |
| *G06F 16/35* | (2019.01) |
| *G06F 16/93* | (2019.01) |
| *G06F 16/9038* | (2019.01) |

(52) U.S. Cl.
CPC .......... *G06F 16/34* (2019.01); *G06F 16/353* (2019.01); *G06F 16/9038* (2019.01); *G06F 16/93* (2019.01); *G06Q 30/0201* (2013.01)

(58) Field of Classification Search
CPC .... G06F 16/34; G06F 16/9038; G06F 16/363; G06F 16/93; G06Q 30/0201
See application file for complete search history.

(56) References Cited

U.S. PATENT DOCUMENTS

| | | | |
|---|---|---|---|
| 5,680,475 A | 10/1997 | Zwierski et al. | |
| 5,774,833 A | 6/1998 | Newman | |
| 6,049,811 A | 4/2000 | Petruzzi et al. | |
| 6,078,327 A | 6/2000 | Liman et al. | |
| 6,271,846 B1 | 8/2001 | Martinez et al. | |
| 6,298,327 B1 | 10/2001 | Hunter et al. | |
| 6,339,767 B1 | 1/2002 | Rivette et al. | |
| 6,449,026 B1 | 9/2002 | Min et al. | |
| 6,499,026 B1 | 12/2002 | Rivette et al. | |
| 6,738,761 B1 | 5/2004 | Oura | |
| 7,171,619 B1* | 1/2007 | Bianco | G06F 16/907 715/206 |
| 7,290,223 B2 | 10/2007 | Decombe | |

(Continued)

OTHER PUBLICATIONS

Yaakov Yaari "Texplore" Feb. 28, 2003.

*Primary Examiner* — Paul Kim
(74) *Attorney, Agent, or Firm* — NEO IP

(57) ABSTRACT

An interactive, dynamic GUI for visualization of patent documents including content-dense graphics illustrating the number, content size, type of a multiplicity of patent documents (issued or granted patent versus published pending application), distributed over time, with comparison to similar patent documents, market events, and expert insights based upon content of specification or detailed description and claims, all within a predetermined technology sector having at least one sub-sector or category within the technology sector.

18 Claims, 22 Drawing Sheets

(56) References Cited

U.S. PATENT DOCUMENTS

| | | |
|---|---|---|
| 7,353,464 B1 | 4/2008 | Kundu et al. |
| 7,644,360 B2 | 1/2010 | Beretich, Jr. et al. |
| 7,739,133 B1 | 6/2010 | Hail et al. |
| 7,770,107 B2 | 8/2010 | Jiang et al. |
| 7,797,336 B2 | 9/2010 | Blair et al. |
| 7,949,728 B2 | 5/2011 | Rivette et al. |
| 8,196,030 B1 | 6/2012 | Wang et al. |
| 8,694,504 B2 | 4/2014 | Beretich, Jr. et al. |
| 9,104,648 B2 | 8/2015 | Glasgow |
| 9,430,756 B2 | 8/2016 | Glasgow |
| 9,483,551 B2 | 11/2016 | Beretich, Jr. et al. |
| 9,922,383 B2 | 3/2018 | George |
| 2001/0049707 A1 | 12/2001 | Tran |
| 2002/0000998 A1 | 1/2002 | Scott et al. |
| 2002/0007373 A1 | 1/2002 | Blair et al. |
| 2002/0022974 A1 | 2/2002 | Lindh |
| 2002/0103809 A1 | 8/2002 | Starzl et al. |
| 2002/0107896 A1 | 8/2002 | Ronai |
| 2002/0184254 A1 | 12/2002 | Williams et al. |
| 2002/0188608 A1 | 12/2002 | Nelson et al. |
| 2003/0014415 A1 | 1/2003 | Weiss et al. |
| 2003/0033295 A1 | 2/2003 | Adler et al. |
| 2003/0061243 A1 | 3/2003 | Kim et al. |
| 2003/0065637 A1 | 4/2003 | Glasgow |
| 2003/0093755 A1 | 5/2003 | O'Carroll |
| 2003/0154204 A1 | 8/2003 | Chen-Wright et al. |
| 2004/0015481 A1 | 1/2004 | Zinda |
| 2004/0073850 A1 | 4/2004 | Opaterny |
| 2004/0078192 A1 | 4/2004 | Poltorak |
| 2004/0215612 A1 | 10/2004 | Brody |
| 2004/0243387 A1 | 12/2004 | Brabander |
| 2005/0071349 A1 | 3/2005 | Jordan et al. |
| 2005/0192968 A1 | 9/2005 | Beretich et al. |
| 2005/0234685 A1 | 10/2005 | Tanigawa |
| 2007/0022110 A1 | 1/2007 | Suda et al. |
| 2007/0233692 A1 | 10/2007 | Lisa et al. |
| 2007/0294664 A1 | 12/2007 | Joshi |
| 2010/0190143 A1 | 7/2010 | Gal et al. |
| 2014/0379590 A1* | 12/2014 | Germeraad ........ G06Q 10/0639 705/310 |
| 2016/0350886 A1* | 12/2016 | Jessen ................ G06Q 50/184 |
| 2017/0046398 A1 | 2/2017 | Beretich, Jr. et al. |
| 2017/0220938 A1* | 8/2017 | Sainani ............. G06F 16/2471 |

\* cited by examiner

The invention provides biomedical devices. In particular, the invention provides biomedical devices on the surfaces of which stable, hydrophilic, amide-containing coatings are formed.

1. A method for manufacturing biomedical devices comprising the step of contacting at least one surface of a biomedical device, the surface comprising an effective amount of carboxyl groups, with a coating-effective amount of an amine and a coupling effective amount of at least one coupling agent at a temperature of about 0 to about 95 degree. C. and for a time of about 1 to about 360 minutes to produce a stable, amide-containing coating on the surface.

10. A method for manufacturing biomedical devices comprising the steps of a.) coating at least one surface of a device with one or more carboxyl functional polymers; and b.) contacting the at least one surface with a coating-effective amount of an amine and a coupling effective amount of at least one coupling agent at a temperature of about 0 to about 95 degree. C. and for a time of about 1 to about 360 minutes to produce a stable, amide-containing coating on the surface.

29. A contact lens comprising at least one surface having an amide-containing coating coupled thereto by at least one coupling agent.

FIG. 15

INTERACTIVE PATENT VISUALIZATION SYSTEMS AND METHODS

CROSS-REFERENCES TO RELATED APPLICATIONS

The present application is related to and claims priority from the following U.S. patent documents: this application claims priority from U.S. Provisional Patent Application No. 62/614,737, filed Jan. 8, 2018, which is incorporated herein by reference in its entirety.

BACKGROUND OF THE INVENTION

(1) Field of the Invention

The present invention relates generally to automated work systems and, more particularly, to automated work systems and methods for analyzing patent documents using interactive graphic user interface visualization.

(2) Description of the Prior Art

The number of patent applications is increasing yearly. From 1963 through 1983, approximately 100,000 patent applications per year were filed at the United States Patent & Trademark Office (USPTO); in 2001 alone, 326,508 patent applications were filed; and most recently in fiscal year 2016-2017 USPTO reported 647,388 patent applications were filed. Technology innovation, which needs patent protection to attract capital for development and commercialization, is driving this trend. Interestingly, technology is also facilitating the trend: word processing, remote electronic database searching, and similar technologies are facilitating the patent application process, both for high-technology and low-technology inventions. This large increase in patent applications, and patents in general, means that the ability to understand and communicate patent documents and competitive position with respect to a large field of other patent property is a difficult task, and is only becoming more difficult with time.

Thus, a need exists for automated systems and methods to provide for dynamic visualization of patent documents that provide for interactive graphic user interface (GUI) visuals relating to issued patents and/or patent applications.

SUMMARY OF THE INVENTION

The present invention provides a system, method, and dynamic, interactive graphical user interface (GUI) for visualization and for analyzing patent documents, including text-based descriptions, diagrams or figures, and intellectual property as set forth in the patent document claims for each of the multiplicity of patent documents.

In one aspect, the system includes: at least one device in network-based communication with a remote computer and/or cloud-based computing system having a database of patent documents including figures and text descriptions and claims.

The present invention provides a patent forecast diagram for providing information about technology evolution in predetermined technology sectors including an interactive, dynamic GUI for visualization of patent documents including content-dense graphics illustrating the number, content size, type of a multiplicity of patent documents (issued or granted patent versus published pending application), distributed over time, with comparison to similar patent documents based upon content of specification or detailed description and claims, and visual enunciation of human and computer determined insights and similarities regarding single patents or groups of patents, all within a predetermined technology sector having at least one sub-sector or category within the technology sector.

These and other aspects of the present invention will become apparent to those skilled in the art after a reading of the following description of the preferred embodiment when considered with the drawings.

BRIEF DESCRIPTION OF THE DRAWINGS

FIG. 14 is a screen view of an automated system according to one embodiment of the present invention.

Figure 15:
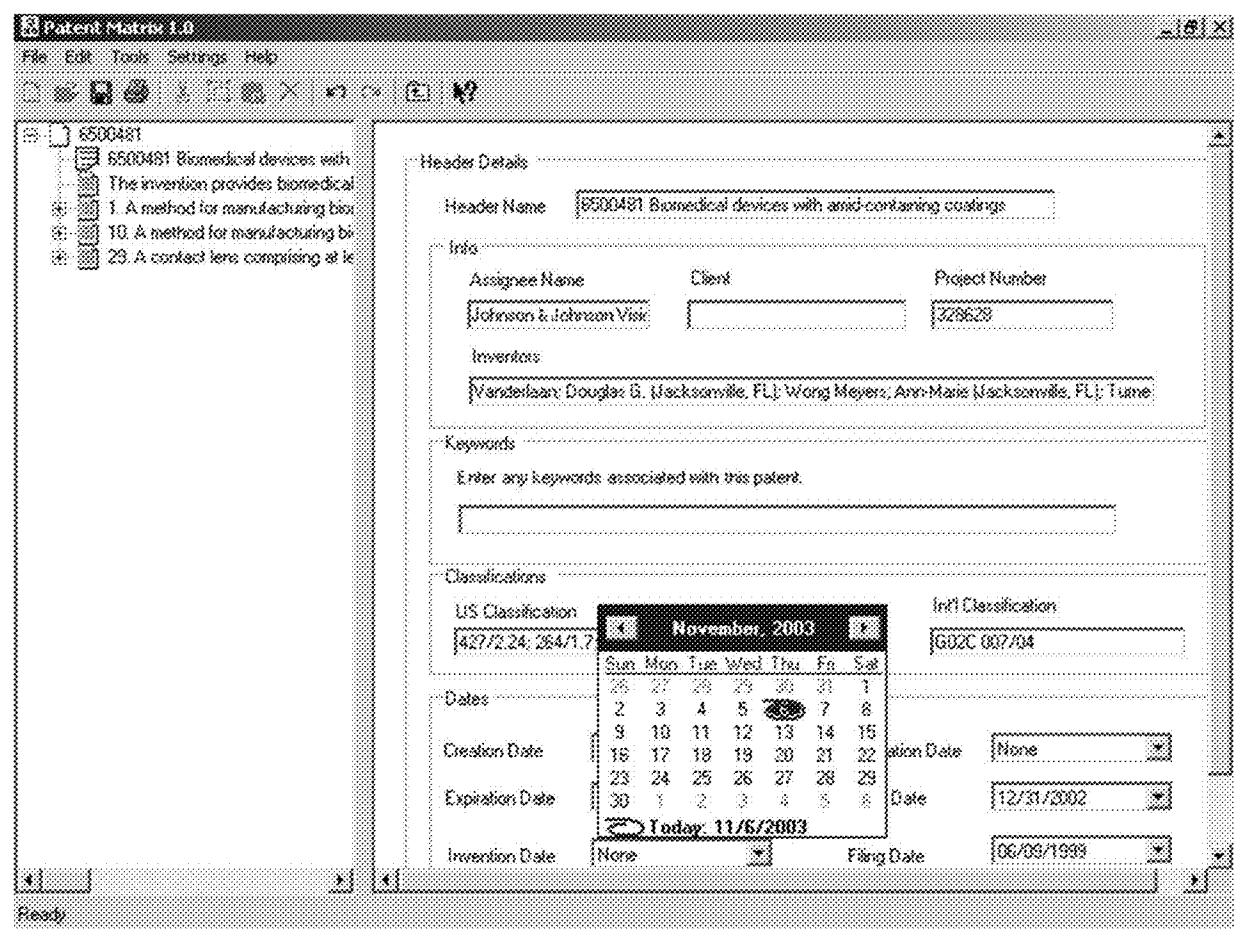

FIG. 15 is a screen view of an automated system according to one embodiment of the present invention.

DETAILED DESCRIPTION OF THE PREFERRED EMBODIMENTS

Figure 1:
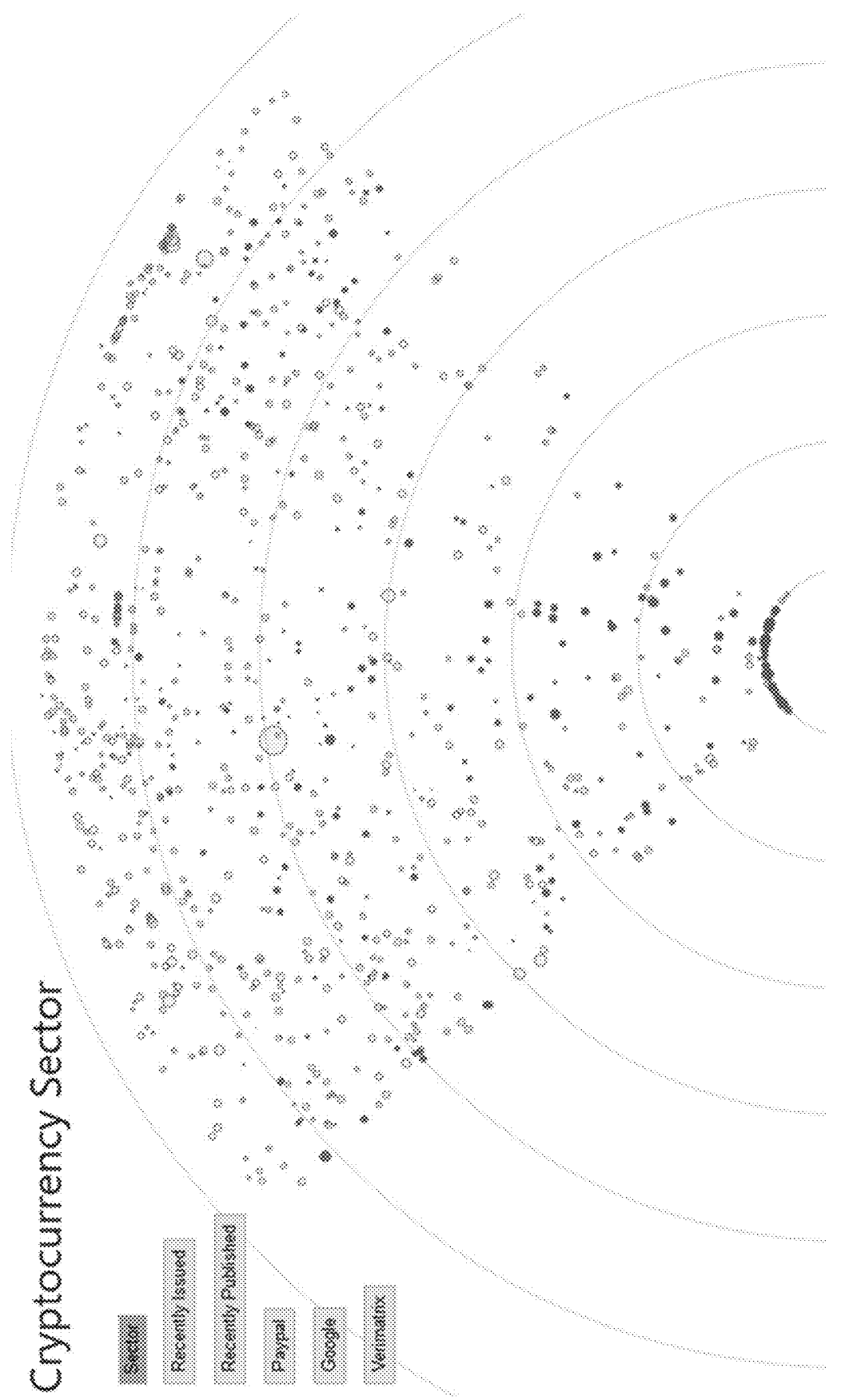
FIG. 1 is an image of a graphic user interface (GUI) according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

The present invention provides systems and methods for automatically generating from patent research data a patent forecast diagram for providing information about technology evolution in predetermined technology sectors and patent market value based on relevant context including but not limited to patent context and market or commercial data, the patent forecast diagram including an interactive, dynamic GUI for visualization of patent documents including content-dense graphics illustrating the number, content size, type of a multiplicity of patent documents (issued or granted patent versus published pending application), distributed over time, with comparison to similar patent documents based upon content of specification or detailed description and claims, visual enunciation of human and computer determined insights and similarities regarding single patents or groups of patents, and visual representation of related real world events including news articles, press releases, product announcements, and professional opinion articles, all within a predetermined technology sector having at least one sub-sector or category within the technology sector.

The systems and methods of research, analysis and visualization of the present invention provide for enhanced tagging, grouping, or association features for research results (e.g., documents or data elements) that provide for automatic links directly to the Cooperative Patent Classification (CPC) number that corresponds to each patent document, i.e., US issued patent document and/or US published pending application document, plus user defined and computer automated tagging connectivity among similar and dissimilar patent documents derived by incorporating patent document properties including claim text, abstract text, activity dates, CPC classifications, and user defined metadata.

The present invention provides for a system for automatically generating from patent research data a patent forecast diagram for providing information about technology evolution in predetermined technology sectors and patent market value based on relevant context including but not limited to patent context and market or commercial data, the patent forecast diagram including an interactive, dynamic GUI for visualization of patent documents including content-dense graphics illustrating a number or volume, a content size, a type of a multiplicity of patent documents selected from issued or granted patents and published pending applications, distributed over time, with comparison to similar patent documents based upon content of specification or detailed description and claims, visual enunciation of human and computer determined insights and similarities regarding single patents or groups of patents, and a visual representation of related business events information including news articles, press releases, product announcements, and professional opinion articles, all within a predetermined technology sector having at least one sub-sector or category within the technology sector. The automated research, analysis, and visualization functions of the present invention provide for automated tagging, grouping, and association for research results based upon machine learning of software comparing data from network-based sources in real time.

Also, the business events information is distributed over a multiplicity of websites on the internet, which could not be automatically performed without the use of machine learning software code within the present invention, which also provide for the business events information to be automatically searched and retrieved by at least one programmed command. At least one programmed command is generated by the machine learning software for automatically curating the business events information and prioritizing it based upon relevance to the predetermined technology sector and recency. The automated research, analysis, and visualization functions provide for automated tagging, grouping, and association for research results based upon machine learning of software comparing data from network-based sources in real time.

Preferably, the research results include electronic documents or data elements having automatic links directly to a company website hosted on the internet and real time stock status and price for public companies. Also, the research results include electronic documents or data elements having automatic links directly to a Cooperative Patent Classification (CPC) number that corresponds to each patent document.

Preferably, automated tagging connectivity provided among similar and dissimilar patent documents is generated by artificial intelligence (AI) or machine learning algorithms in software code for automatically incorporating patent document properties including claim text, abstract text, activity dates, CPC classifications, and metadata. In one embodiment, the present invention provides an AI model configured for supervised, unsupervised, or reinforced learning or training. In one embodiment, the AI model is based on multiple sets of training data. The multiple sets of training data are a subset of user input data. For example, a user device is enabled to tag patent documents with category labels, and those patent documents tagged with category labels by the user device are used for training the AI model. Each of U.S. Pat. No. 9,922,286 titled "Detecting and Correcting Anomalies in Computer-Based Reasoning Systems" and U.S. application Ser. No. 15/900,398 is incorporated herein by reference in its entirety.

In one embodiment of the present invention, the display label can be different from the tagging label. A tag is a standalone classification based upon predetermined criteria; a tag can be a CPC or linked to a CPC. It provides for tagging within a sector; visual can be automatically displaying tags within a sector and/or the visualization can be modified selectively to display alternative tags within the sector, i.e., tags that were not used automatically for grouping results within a data set for a sector. If tags are linked to at least one CPC, then the tag is automatically highlighted in a detailed view for each of the multiplicity of individual patent documents. Also, the present invention provides for automatic click-select or preprogrammed keys to switch detailed view for other documents. A sector category input can be received by the system from user inputs via interactive graphic user interface (GUI) so that documents can be grouped by sector in addition to being identified by tags or tagging. Tags are user-assigned or automatically assigned by the computer software based on relevance criteria.

The dynamic, interactive visualization of the present invention provides for displaying result sets according to various criteria established during the research phase when inputs are provided for CPC and/or key word research on database, i.e., Structured Query Language (SQL) or N-Gram or N-Graph fuzzy search performed on the database.

The present invention systems and methods provide for content-dense visualization via dynamic, interactive GUIs that display patent document information in combination with insights; patent data is configurable for visual representation and order by time dimensions and further includes: highlighting and association based upon patent asset ownership or assignment recordation for each patent document; drilling into detailed information, such as by way of example and not limitation, patent claims tree diagrams; visually connecting similar patent documents, i.e., related by owner and/or technology classification or sub-classification; and/or visually connecting news events, press releases and/or expert insights to the patent data and its visual representation in the GUI.

Additionally, the database systems and methods of the present invention provide for functionality including: automatically importing documents from one or more direct sources accessible via a network; enabling automated recovery and least cost acquisition of data via the network and at least one source of data; enabling artificial intelligence (AI) or machine learning for automated associations and grouping of data elements and/or enabling human insight and association override of AI-based grouping or associations of data elements; and/or enabling structured and/or fuzzy data retrieval and analysis automatically based upon technology sector targets and search queries.

In a preferred embodiment, a system according to the present invention submits queries to national patent office electronic depositories across one or more electronic network in real-time and receives the query results from the national patent office electronic depositories across one or more electronic networks in near-real-time. Thus, a method of the present invention includes the steps of submitting queries in real-time across an electronic network to a national patent office depository and receiving the query results in near-real-time across the electronic network from the national patent office depository.

In one embodiment, the present invention provides systems and methods for interactive patent visualization. At least one user device is constructed and configured for network communication with at least one server platform. The at least one server platform provides an interactive and dynamic graphical user interface (GUI) to the at least one user device. The at least one server platform comprises an intelligence engine including an artificial intelligence (AI) model. The at least one server platform accesses at least one national patent database, and generates a patent forecast diagram based on patent data from the at least one national patent database. The patent forecast diagram comprises a multiplicity of graphics distributed over time and by category, representing a distribution of patent documents for a predetermined technology sector over time, with each graphic representing a patent document. The at least one user device displays the patent forecast diagram via the interactive and dynamic GUI. The at least one user device is enabled to click-select one of the multiplicity of graphics and display related patent data represented by the click-selected one of the multiplicity of graphics. The category comprises at least one category label. In one embodiment, the intelligence engine automatically creates the at least one category label and tag the patent documents with the at least one category label based on patent document information including claim text, abstract text, activity dates, CPC codes, and metadata. In one embodiment, the at least one user device tags a multiplicity of patent documents with the at least one category label. The intelligence engine is operable to train the AI model based on the multiplicity of patent documents tagged by the at least one user device. In one embodiment, the size of each of the graphics represents a length of the patent document. In one embodiment, the multiplicity of graphics comprises at least one geometric shape, and the at least one geometric shape comprises at least one circle. In one embodiment, the at least one circle comprises a filled circle representing an issued patent document. In one embodiment, the at least one circle comprises an unfilled circle representing a published pending patent application.

In one embodiment, the at least one server platform is further operable to access to a multiplicity of market related databases, and generate a visual representation of market information including news articles, press releases, product announcements, and professional opinion articles for the predetermined technology sector. The at least one user device is enabled to display the visual representation of market information via the interactive and dynamic GUI. In one embodiment, the at least one server platform is operable to search and retrieve the market information from the multiplicity of market related databases. In one embodiment, the at least one server platform comprises an intelligence engine including a machine learning model operable to automatically curate and prioritize the market information based upon a relevancy value and a recency value for the predetermined technology sector. The market information includes electronic documents or data elements having automatic links directly to a company website hosted on the internet, real time stock status and price for public companies. In one embodiment, the at least one server platform performs advanced analytics and provides insights for the predetermined sector based on the patent data and the market information.

FIGS. 1-7 illustrate various screen shot views of a display for the dynamic, interactive visualization of data by the present invention. FIG. 1 illustrates an example advanced technology sector pertaining to cryptocurrency inventions wherein the circles on the display each represent an unique patent document, i.e., either a published pending patent application or issued patent document. The size of the circle indicates the length of the document itself, i.e., a larger or longer document is represented by a circle having a larger diameter than others within the sector. A solid or shaded circle indicates an issued patent; by contrast, a published pending patent application is represented by an open circle without solid center, i.e., it is empty within the circumference, or it is illustrated with lighter shading.

The systems and methods of the present invention also automatically update the technology sector and all data that meets the criteria for the sector as any new data are available, e.g., for patent data, new publications of patent applications and new patent grants are available on a weekly basis from their direct source, which is the patent office for each country or the governing authority or government agency responsible for the publications and issuances of patent applications and patents, respectively. The systems and methods ensure reliable data acquisition from the direct source via software automation, failover methods, and prioritization of direct source based on timeliness and cost.

The display provides for records to be distributed over a radial or scatter plot diagram, with the documents distributed from the origin to the extent based on publication or issue date. In one embodiment, the documents are distributed from the periphery of the diagram based upon publication or issue date. In a preferred embodiment, the oldest documents are at the origin of the diagram and the most recently published or issued at the extent. Other criteria for distributing the documents are also provided for. For example, the documents can be distributed by application date, priority date, assignment date, rejection date, decision date, or market event date, such as financing event announcement or press release date.

Figure 2:
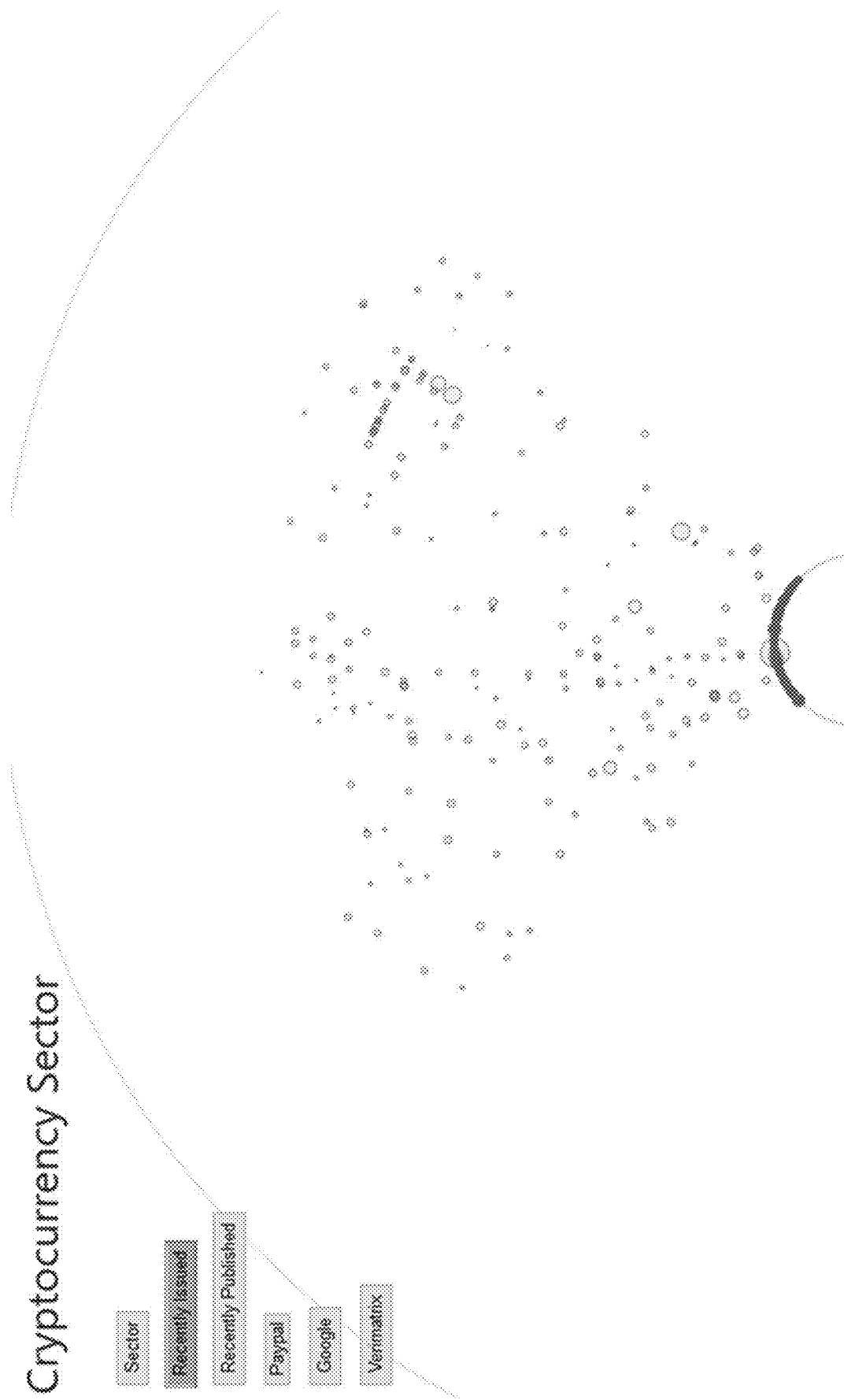
FIG. 2 is an image of a graphic user interface (GUI) according to one embodiment of the present invention.
Figure 3:
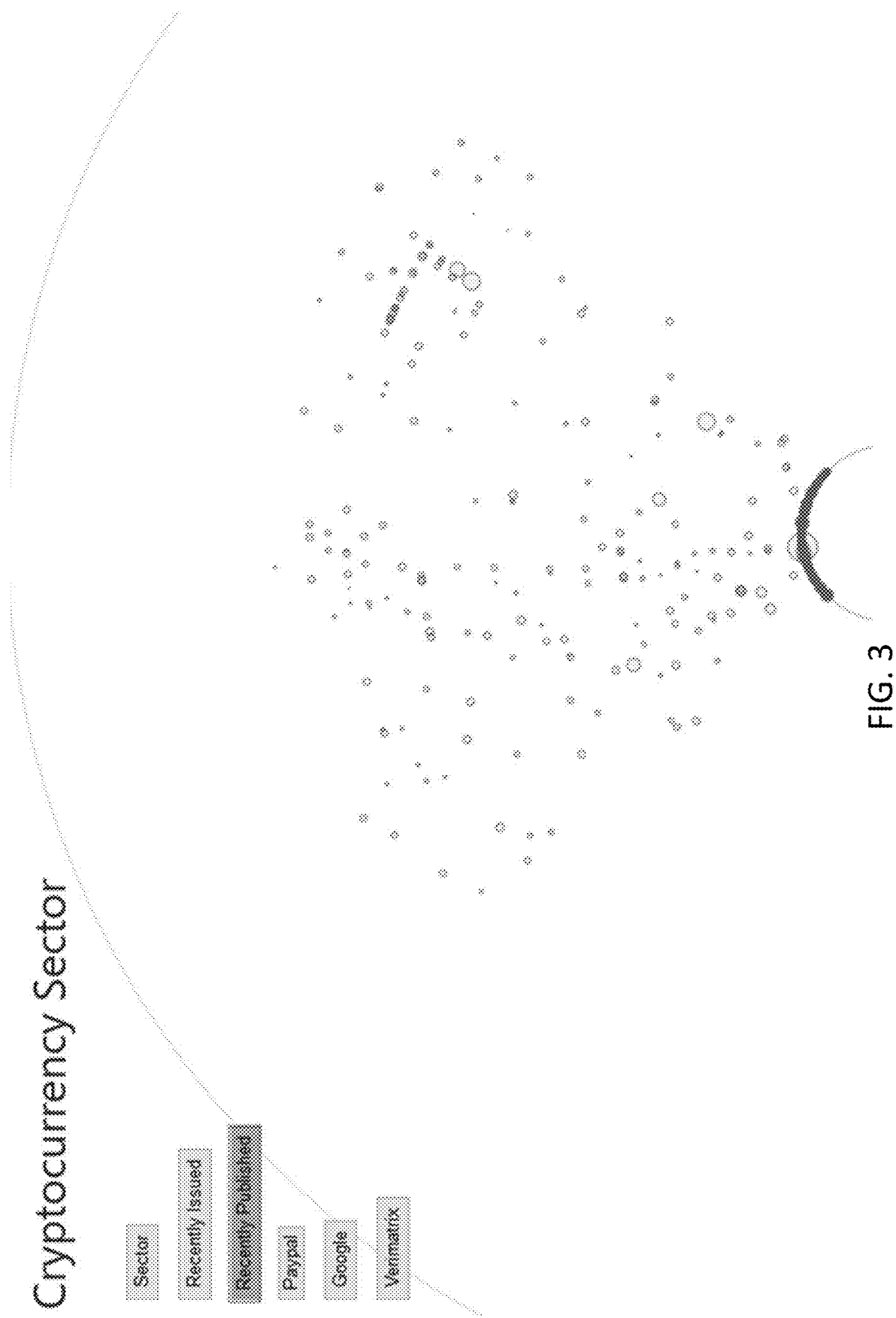
FIG. 3 is an image of a graphic user interface (GUI) according to one embodiment of the present invention.

The display provides for expanding and contracting time scales. In FIGS. 2 and 3, the diagram is displaying the recently issued patents or published applications, respectively. The current year's records are displayed in an expanded manner, whereas the previous years' records are contracted onto the origin of the diagram.

Figure 4:
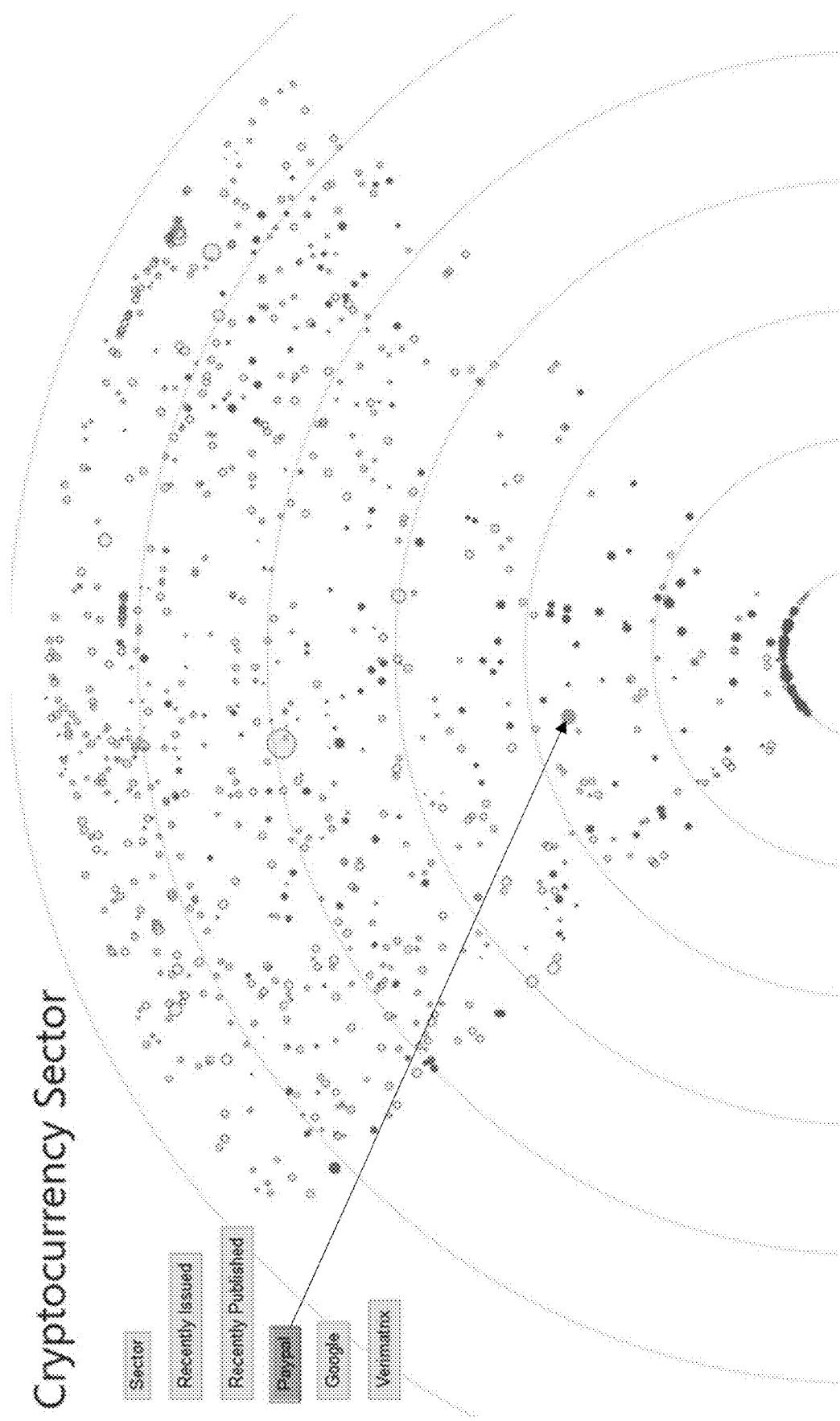
FIG. 4 is an image of a graphic user interface (GUI) according to one embodiment of the present invention.
Figure 5:
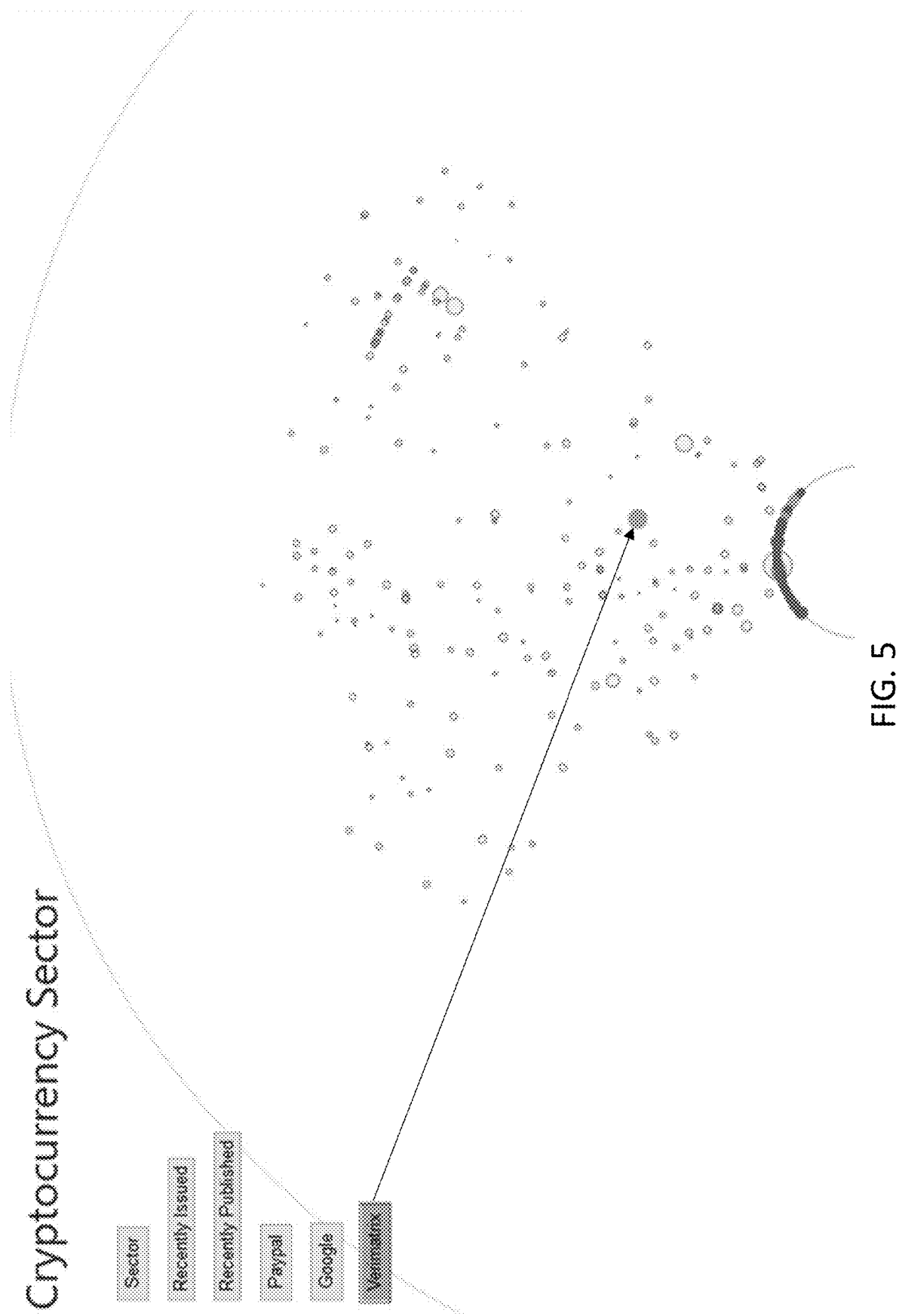
FIG. 5 is an image of a graphic user interface (GUI) according to one embodiment of the present invention.
Figure 7:
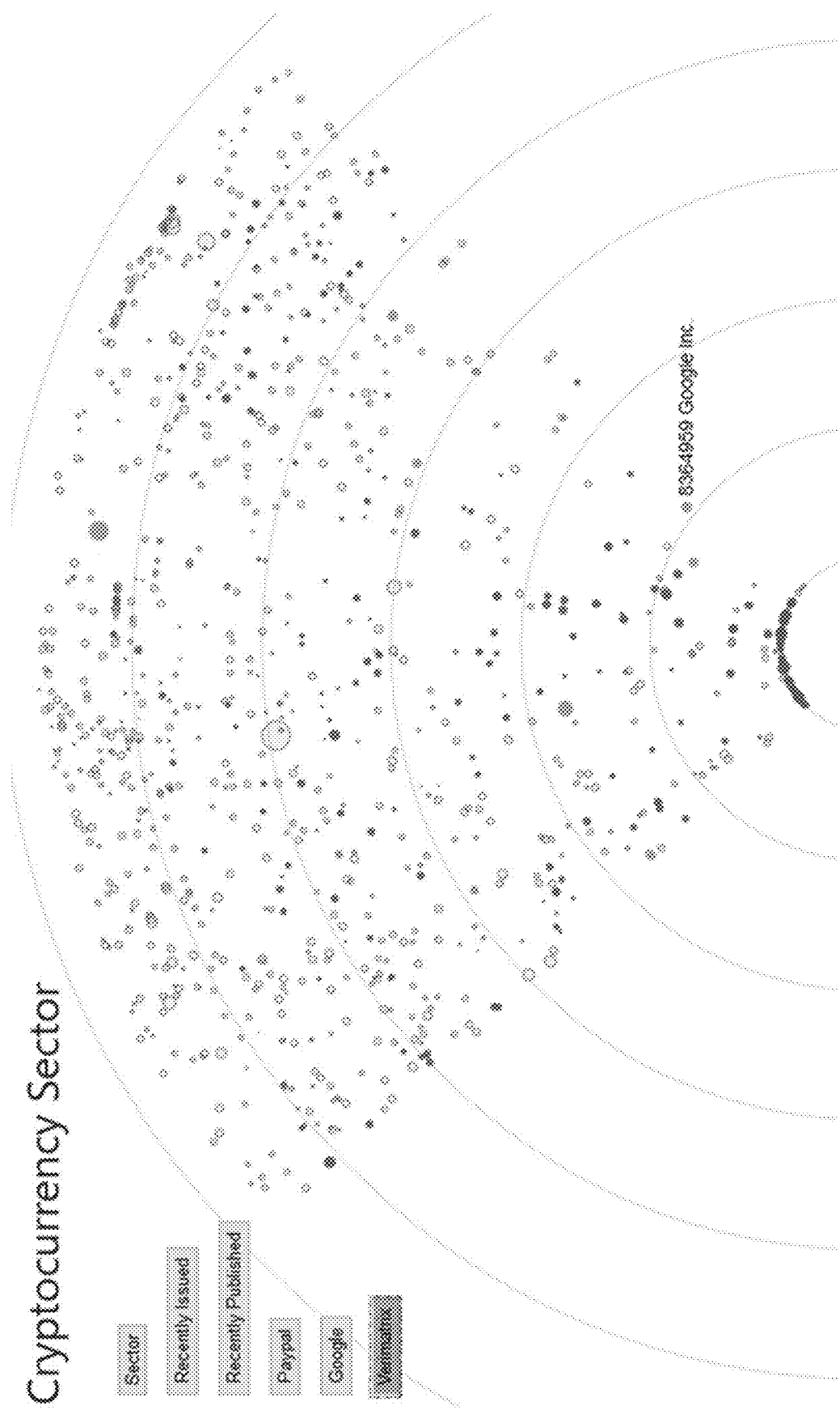
FIG. 7 is an image of a graphic user interface (GUI) according to one embodiment of the present invention.

The display provides for highlighting records by assignee and other matching criteria. FIG. 4 shows a diagram with the assignee PAYPAL (RT) selected and the corresponding document highlighted. FIGS. 5 and 7 show diagrams with the assignee VERIMATRIX (RT) selected.

Figure 6:
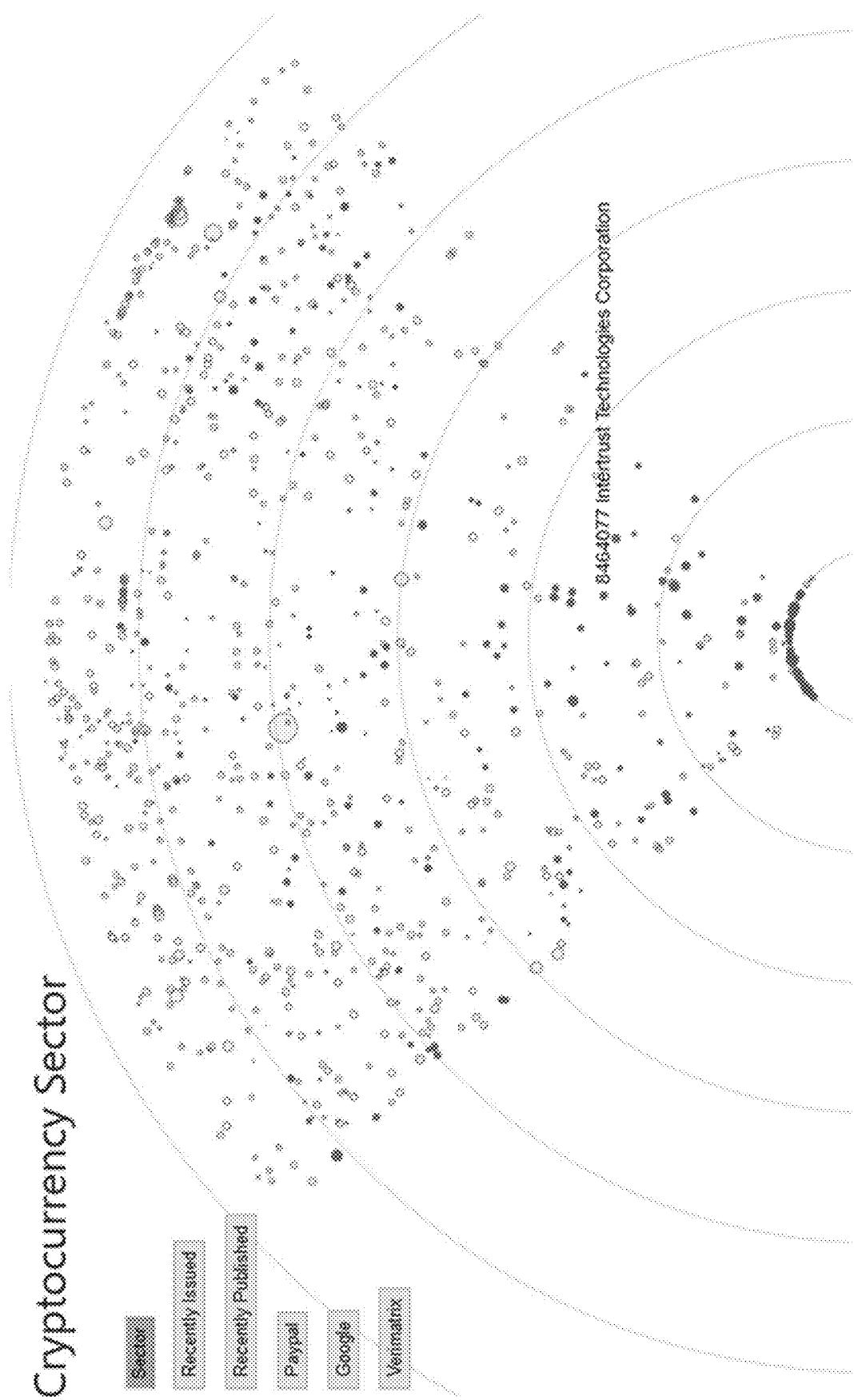
FIG. 6 is an image of a graphic user interface (GUI) according to one embodiment of the present invention.

The display provides for a roll-over pop-up of information, such as document number, assignee, title, abstract and the like. FIG. 6 shows a pop-up of the document number and the assignee. The display pop-up information is multi-platform aware, working on desktop, laptop, tablet, smartphone, and kiosk user interface technologies. The display pop-up enables the user to navigate to additional displays that provider more detailed information about the document, its components, and/or connected information. The system also provides for displaying records in bar charts by various criteria.

Figure 8:
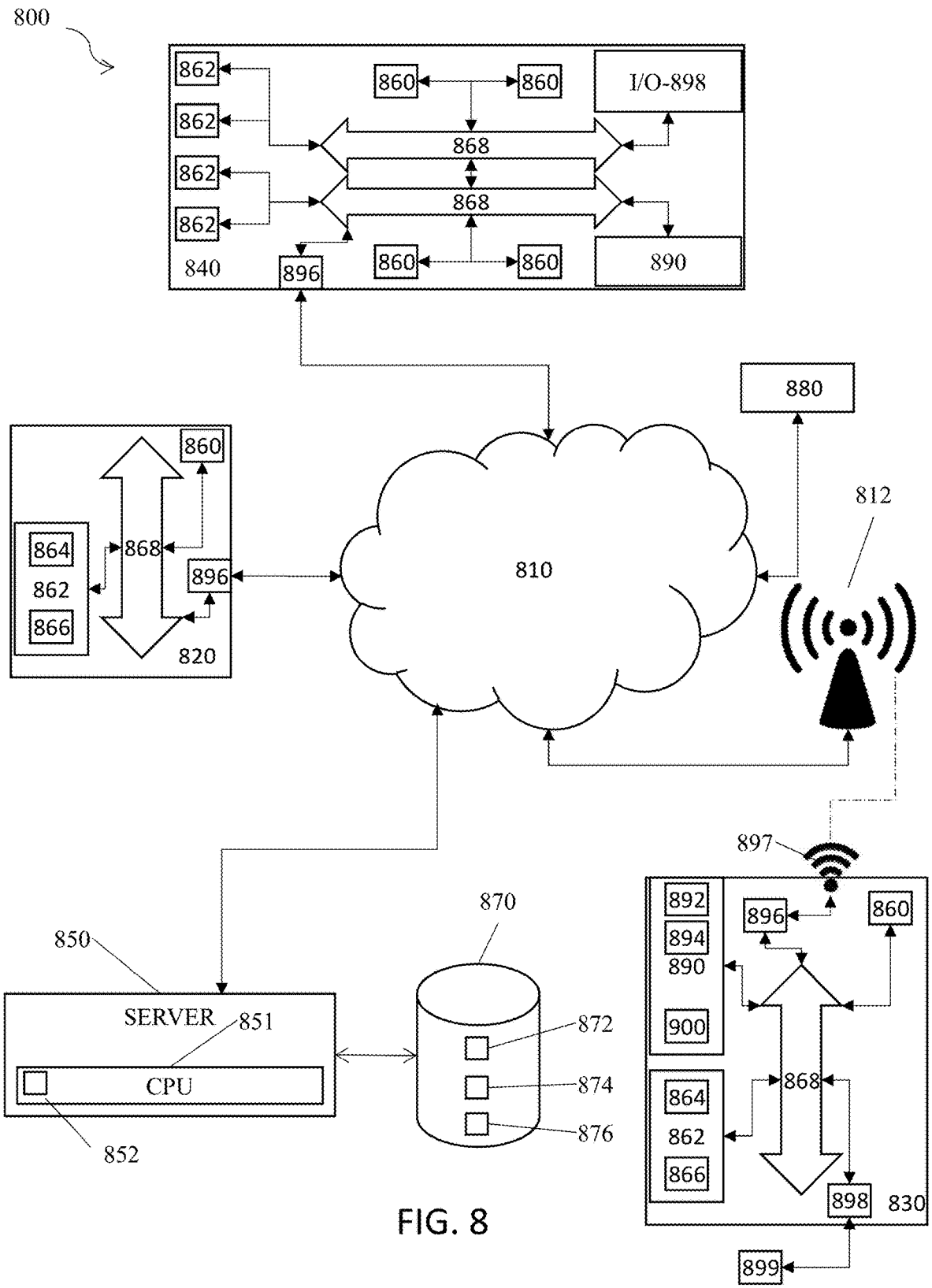
FIG. 8 is a schematic of a computer network system according to one embodiment of the present invention.
Figure 9:
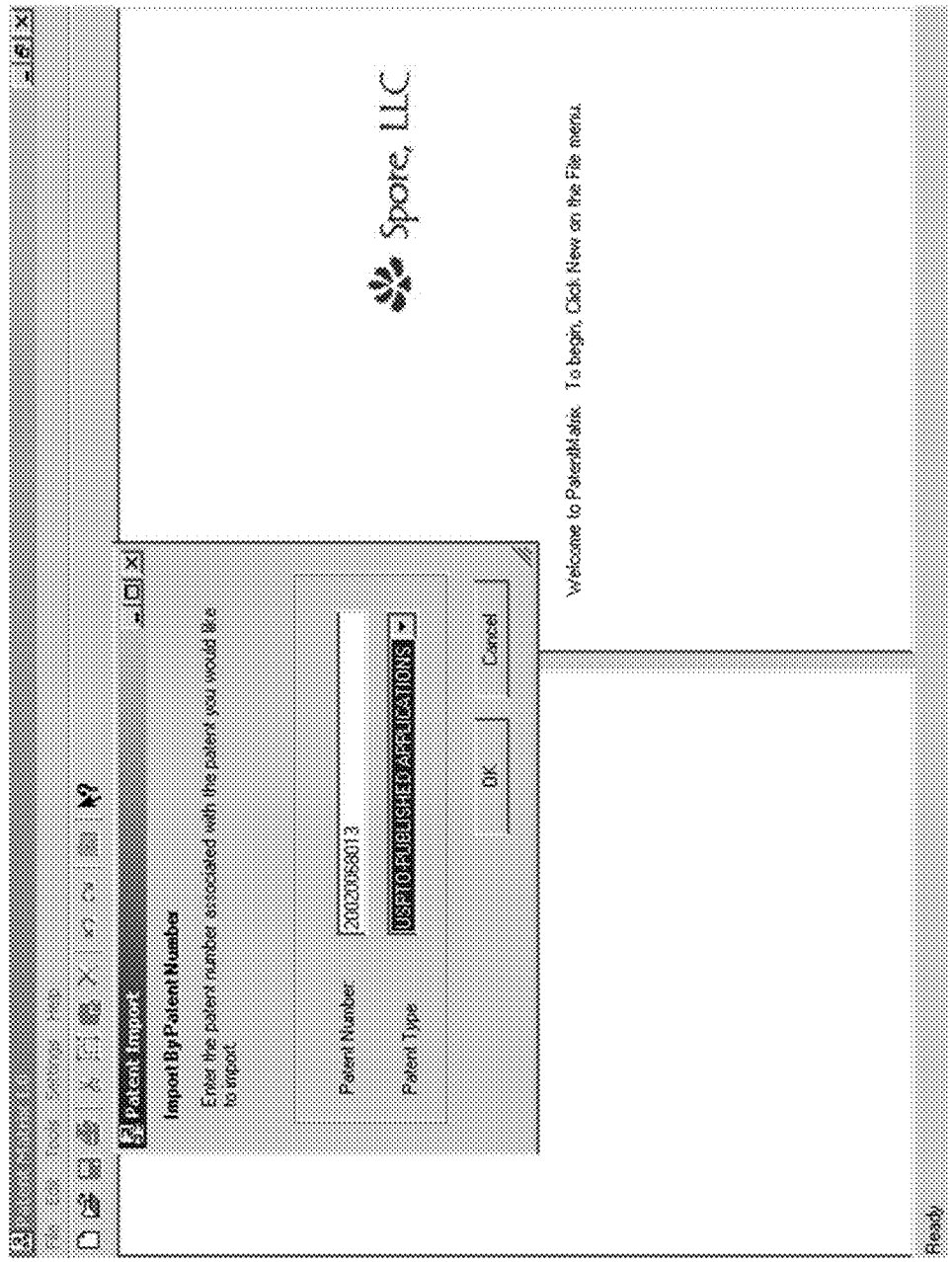
FIG. 9 is a screen view of an automated system according to one embodiment of the present invention.

FIG. 8 is a schematic diagram of an embodiment of the invention illustrating a computer system, generally described as 800, having a network 810, a plurality of computing devices 820, 830, 840, a server 850 and a database 870. In one embodiment, the system is in electronic communication with at least one national patent office depository database 880.

The server 850 is constructed, configured and coupled to enable communication over a network 810 with computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 8, may include other components that are not explicitly shown in FIG. 8, or may utilize an architecture completely different than that shown in FIG. 8. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

As illustrated in FIGS. 9-20, the Patent Matrix systems and methods were developed as a software tool to facilitate patent examination and analysis by providing a visual representation of independent and dependent claims in hierarchy and relationship to each other, wherein the visual representation includes both a claim separator or box and the substantive content of each claim, switchable between a collapsed independent claims view and an expanded total claims view. A primary goal of the software is to reduce the amount of information users need to review in order to make a judgment relating to the claims of a patent or patent application; the Patent Matrix dynamic diagrams are preferably interactively linked with the result sets and accessible from within the visualization of the present invention via click select electronic link in an interactive GUI. U.S. application Ser. No. 14/822,405, filed on Aug. 10, 2015, which is a continuation of U.S. application Ser. No. 12/633, 917, filed on Dec. 9, 2009; which is a continuation of U.S. application Ser. No. 10/983,458, filed on Nov. 8, 2004, which claims the priority filing benefit of U.S. Provisional Patent No. 60/518,119 filed Nov. 7, 2003 describe Patent Matrix diagrams and related technology, and each of the above listed applications is hereby incorporated by reference in its entirety.

The Patent Matrix diagram is automatically generated by and/or visually linked and presented on a GUI by the at least one computer, which is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series; and wherein the software is operable for receiving sub-element selections, analyzing the sub-element selections for technology content, searching the at least one database for matching technology content, retrieving the matching technology content, receiving a study purpose; analyzing in real-time a matching technology content record for matching study purpose, retrieving in real-time the matching technology and study purpose content, displaying matching technology and study purpose content thumbnail images beside the patent claims diagram, and displaying matching technology content thumbnail images beside the patent claims diagram, and linking the thumbnail images to their sub-element.

To assist in rapid review of claims, the Patent Matrix software performs these essential functions: automated import of patent claims, automated parsing of the claims into their hierarchy, and compression/expansion functionality of the parsed claims to/from the independent claim level.

The software and system used to generate the claims diagrams, also referred to as Patent Matrix diagrams are operable to automatically and substantially instantly import issued or granted patents and patent application publications (grants/applications) directly from US Patent Office website or other database housing documents or patents, by simply selecting "File, Import", typing in the grant/application number, and selecting the appropriate database. In the example shown in FIG. 9, a graphic user interface on a computer screen is shown with interactive elements permits a user to enter a document identifier, in this example, the document identifier is a number: US patent application 20020068013 is being imported from a predetermined database of documents or data, in this example, the US published patent applications database.

Claims Display—A method of the present invention includes the steps of: a user entering/inputting a unique grant/application identifier into the software via a graphical user interface (GUI) or prompt; the software identifying the grant/publication from a database using the unique identifier; importing/selecting the grant/application from the database; parsing the claims to separate each claim as an element of a Patent Matrix diagram; arranging the claims in a hierarchy according to the claims numbering and relationship to other claims; compressing the claims in the hierarchy to display at least only the independent claims to the user via the GUI; the user selectively expanding the compressed claims and compressing the expanded claims as desired.

Figure 10:
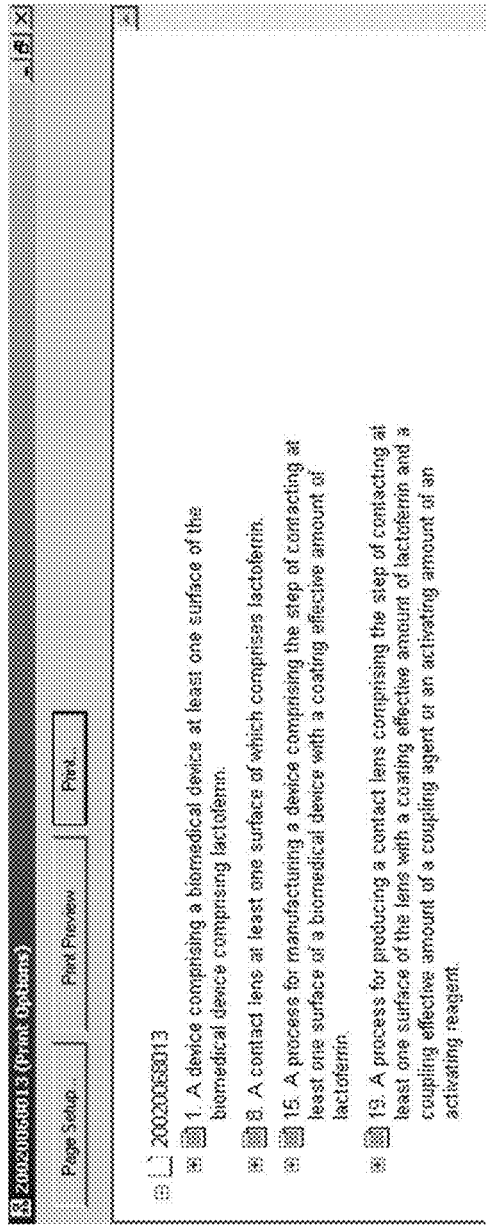
FIG. 10 is a screen view of an automated system according to one embodiment of the present invention.

The document, grant, and/or application is imported, parsed into its hierarchical order, and compressed to the highest level for initial display on an interactive graphical user interface of a computer screen or electronic display, as shown in FIG. 10. The independent claims of US Pub. No. 20020068013 alone are displayed initially, claims 1, 8, 15, and 19 of US Pub. No. 20020068013; a plus sign indicator to the left of the independent claim number indicates whether or not sub-elements (parsed elements of the independent claim) and/or dependent claims are available to be shown in an expanded, or uncompressed view. Alternative indicators are also used, such as a number following the claim text indicating the number of compressed elements connected to that independent or higher level element. Note also that some sub-elements also have compressed elements associated with them, even though the sub-elements are not themselves independent claims or the highest level in a hierarchical relationship.

The diagrammatic user interactive compression of claims is particularly useful for persons examining large numbers of grants/applications. The user can quickly look at the independent claims to ascertain if the claims are relevant to the technology being examined. Dependent claims normally only further delimit independent claims. Therefore, usually if an invention falls outside of the scope of an independent claim, there is no need to further examine the dependent claims. For grants/applications where the claims are close to describing the examined invention, these claims should be examined in details.

Figure 11:
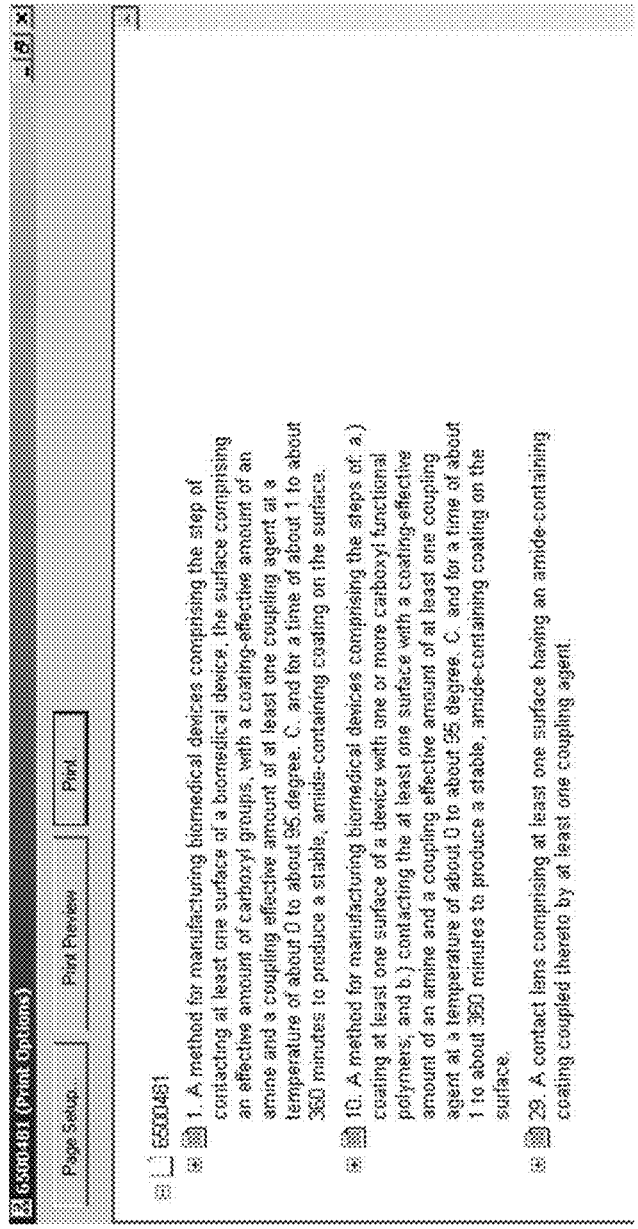
FIG. 11 is a screen view of an automated system according to one embodiment of the present invention.

The independent claims can also be compared to other grants/applications by opening two or more grants/applications in the Patent Matrix. Shown in FIG. 11 is an issued U.S. Pat. No. 6,500,481 related to the technology of the preceding application. Once again, compressed claims are shown in the diagram: claims 1, 10, and 20 are the independent claims series for U.S. Pat. No. 6,500,481. The plus sign to the left of each of these claims numbers indicates that some sub-element or dependent claim exists under each compressed claim in the diagram. Note how much easier it is to compare these two inventions when only the independent claims are visible. Compare this method with a claims comparison using the entire grants/applications by retrieving these patents from the USPTO website.

Figure 12:
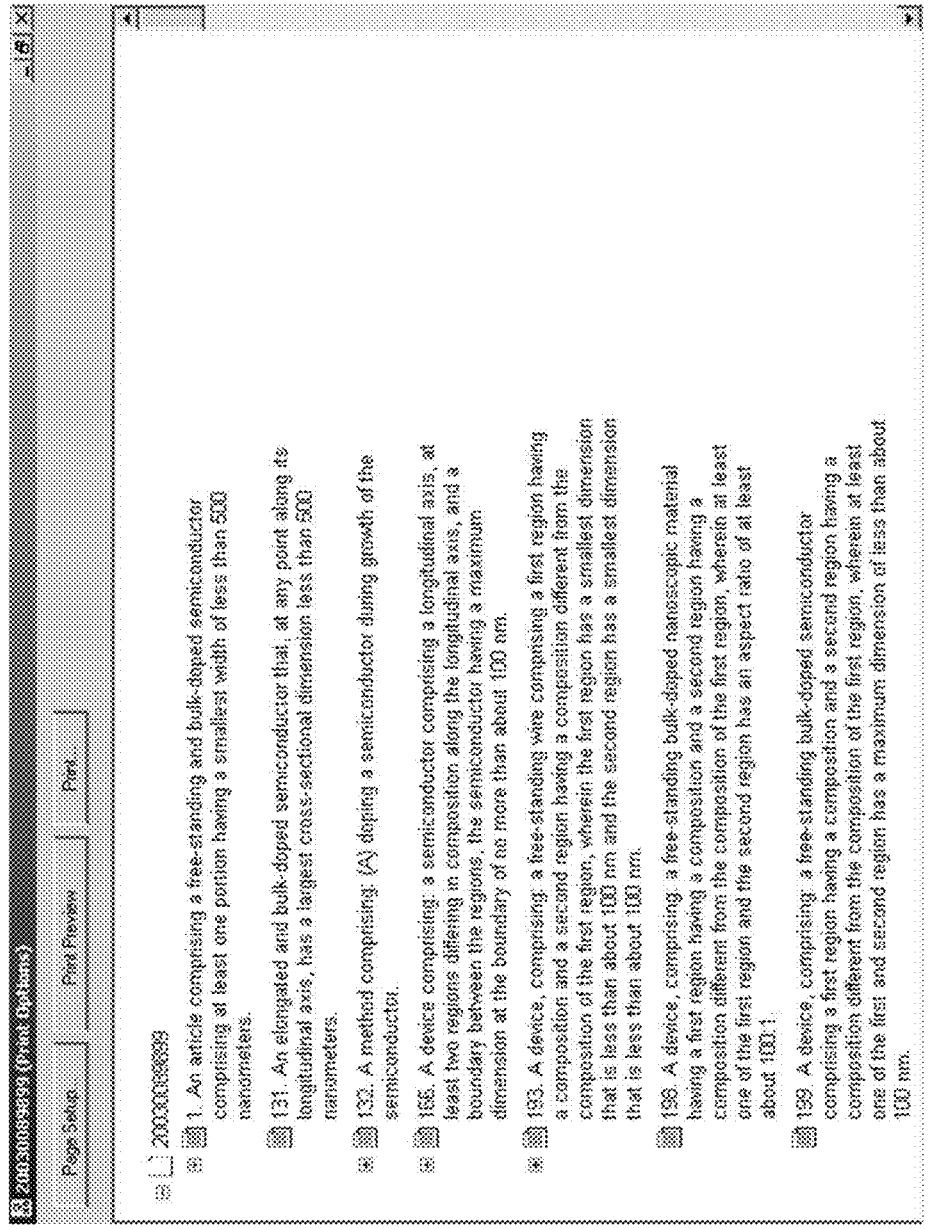
FIG. 12 is a screen view of an automated system according to one embodiment of the present invention.

The utility of the Patent Matrix software increases as the number of claims increases. For example, US Patent Application 20030089899 was imported using the Patent Matrix software. Shown in FIG. 12 is a screen shot of the first seven (7) independent claims. Note how easy it his to examine the seven independent claims without the intervening 192 dependent claims. This is one of the patent applications with a large number of claims mentioned earlier—709 total claims and 72 independent claims. Additionally, independent series of claims can be group by moving claims series up or down relative to one another.

Figure 13:
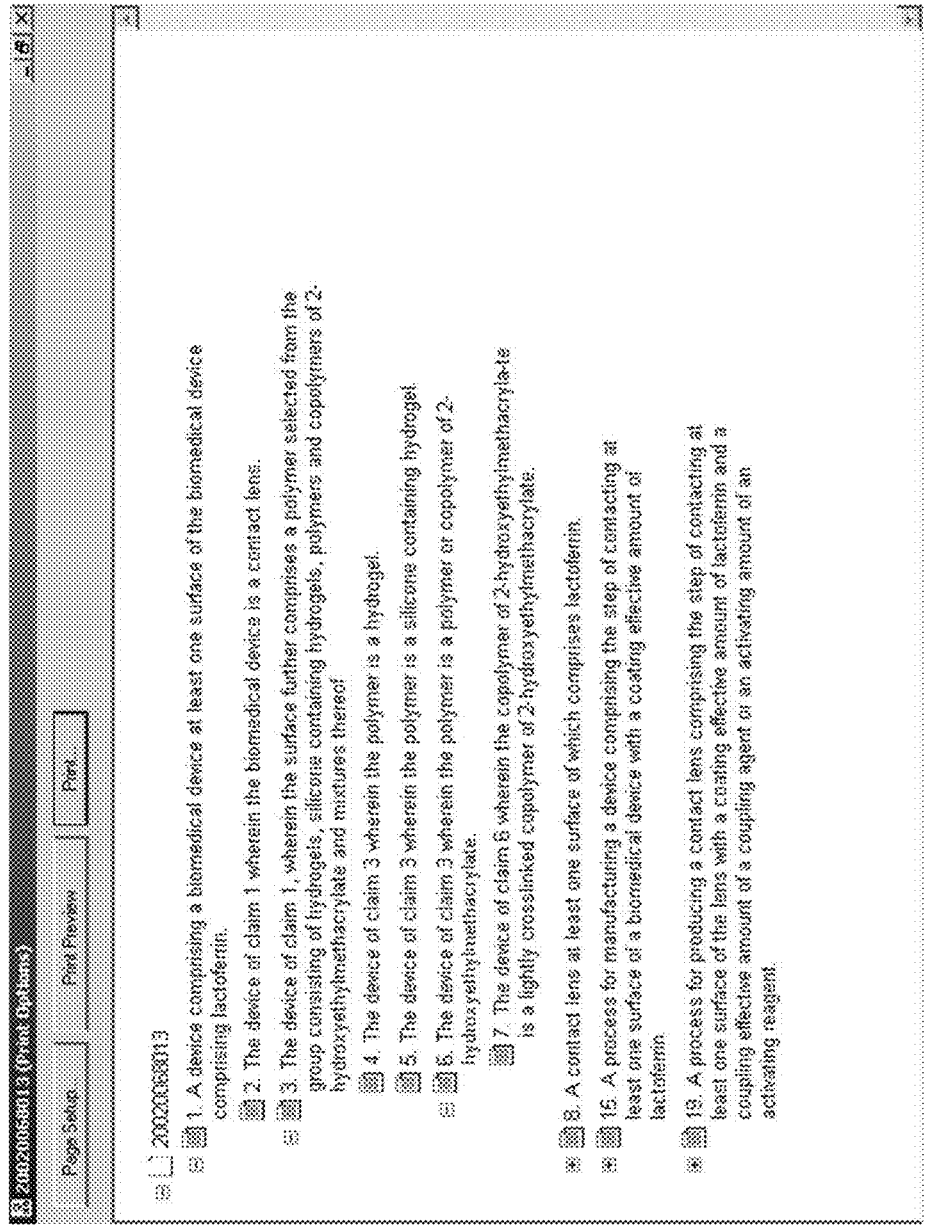
FIG. 13 is a screen view of an automated system according to one embodiment of the present invention.

Expanding the claims to view dependent claims—For grants and/or applications where the independent claims are close to describing the examined invention and may cover the invention, the claims should be examined in detail, including the dependent claims. Independent claim #1 from the US Application 20020068013 has been completely expanded, as shown in FIG. 13. Note the hierarchical dependency of dependent claims 2 through 7, automatically created by the Patent Matrix software import function.

Other fields—In a preferred embodiment of the present invention, the Patent Matrix software also imports other important fields from a grant/application. In addition to the abstract, as shown in FIG. 14, the filing date, inventors, assignees, etc. are imported into their respective fields in the grant/application header, shown in FIG. 15. The date fields include a pop-up calendar to check or change the date and avoid confusion with International/LTS date formats. This header information facilitates the use of Patent Matrix files in an invention or disclosure management system.

Figure 16:
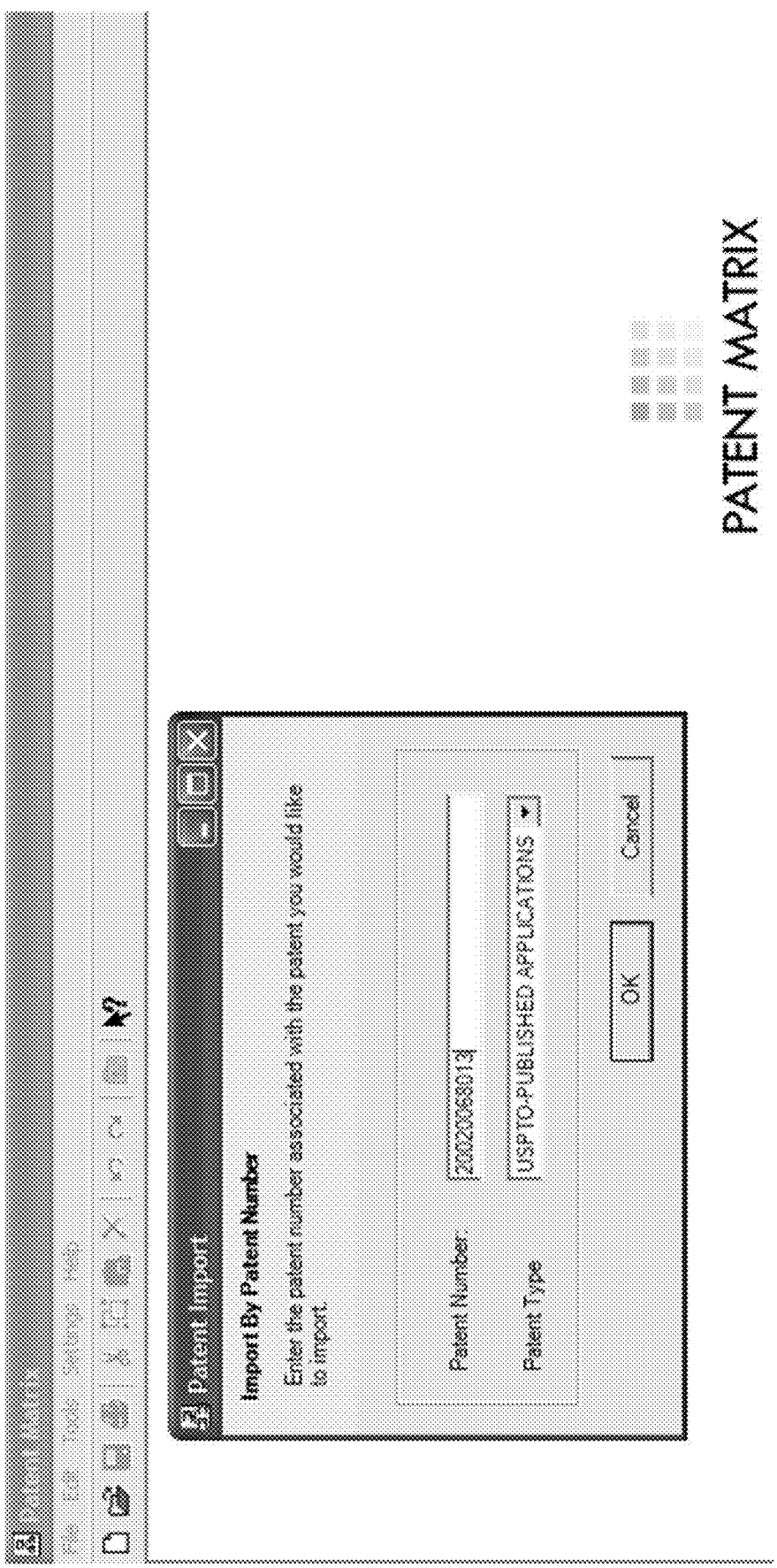
FIG. 16 is another user interface of a compressed claims diagram according to one embodiment of the present invention.
Figure 17:
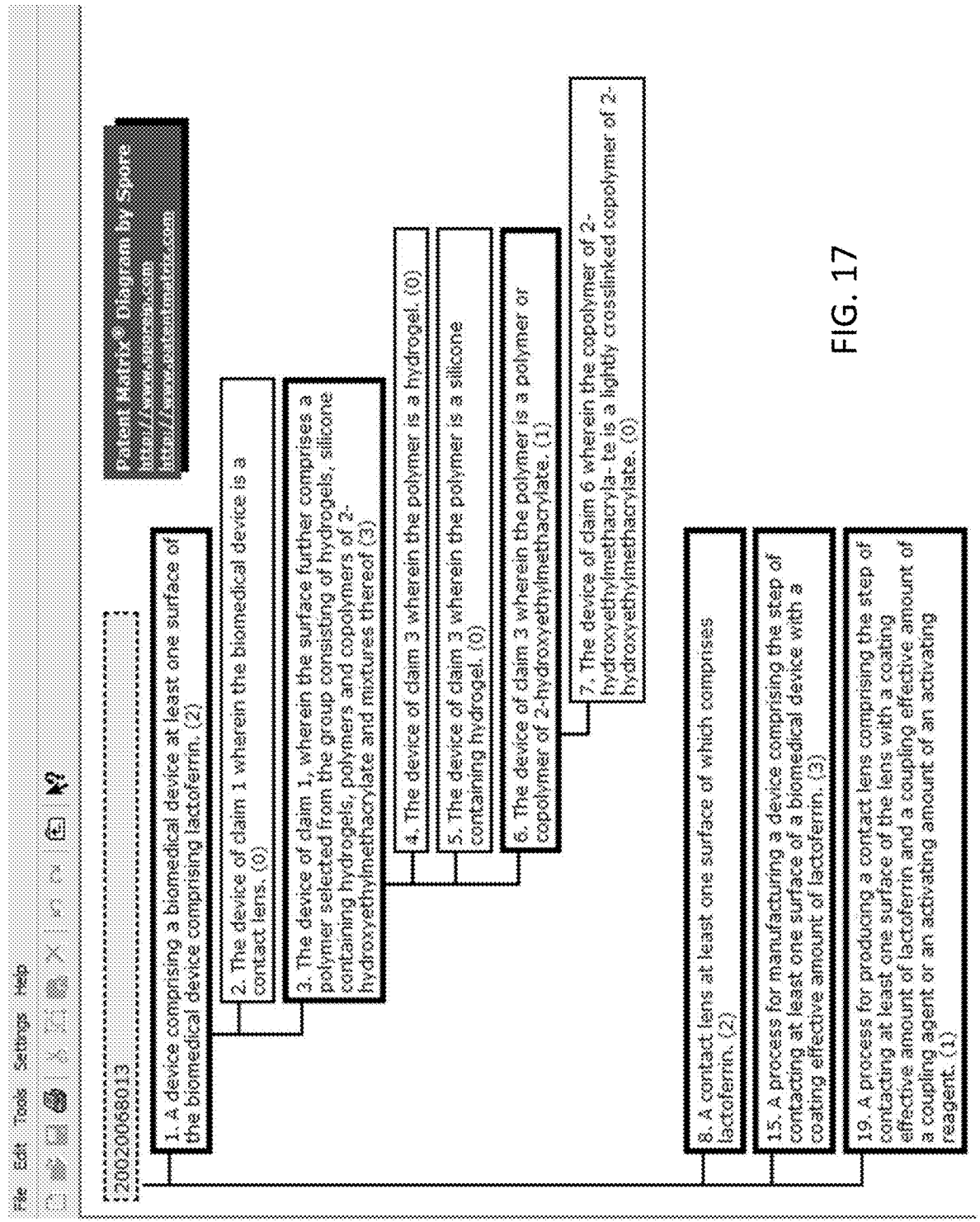
FIG. 17 is another user interface of an expanded view for the claims diagram for the document shown in FIG. 16 according to one embodiment of the present invention.

FIG. 16 is another user interface of a compressed claims diagram. In this example, outlining of elements and sub-elements is provided to further enhance user viewing and analysis, as well as interaction with the diagram and its elements. Coloration, as well as shading and/or font changes are also used to further distinguish hierarchical elements and sub-elements. FIG. 17 is another user interface of an expanded view for the claims diagram for the document shown in FIG. 16.

Thus, the present invention provides a system for displaying patent claims, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series.

Furthermore, the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The imported claims include an entire claims series, an entire patent's claims, multiple patents' claims, and/or at least part of a patent claims series from more than one patent. Further subcomponent parsing is optionally provided for the user.

In the system, the computer is a single computer, a server, or a computer network. The at least one input device communicates with the computer directly, remotely, wirelessly, via the Internet, and combinations, depending upon the system. The at least one output devices is an electronic output device with graphic user interface.

The present invention further provides for a method for displaying patent claims, the method steps comprising:
 a. providing a system as in the foregoing;
 b. selecting at least part of a patent claims series;
 c. importing the at least part of a patent claims series into the data processor running the software;
 d. parsing the at least part of a patent claims series into the claims hierarchy of at least part of a patent claims series;
 e. displaying the parsed at least part of a patent claims series in an interactive format that permits expansion and compression of the at least part of a patent claims series according to the hierarch of the at least part of a patent claims series.

As in the foregoing system, the method provides for steps operable to provide for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states.

The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The present invention further provides for an interactive user interface for providing a diagram of patent claims, the diagram including: an interactive graphical user interface (GUI) viewable on an electronic display, the GUI including a diagram of at least part of a patent claims series; wherein the claims are parsed hierarchically, and the claims are compressible hierarchically.

Furthermore, the GUI of the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

Figure 18:
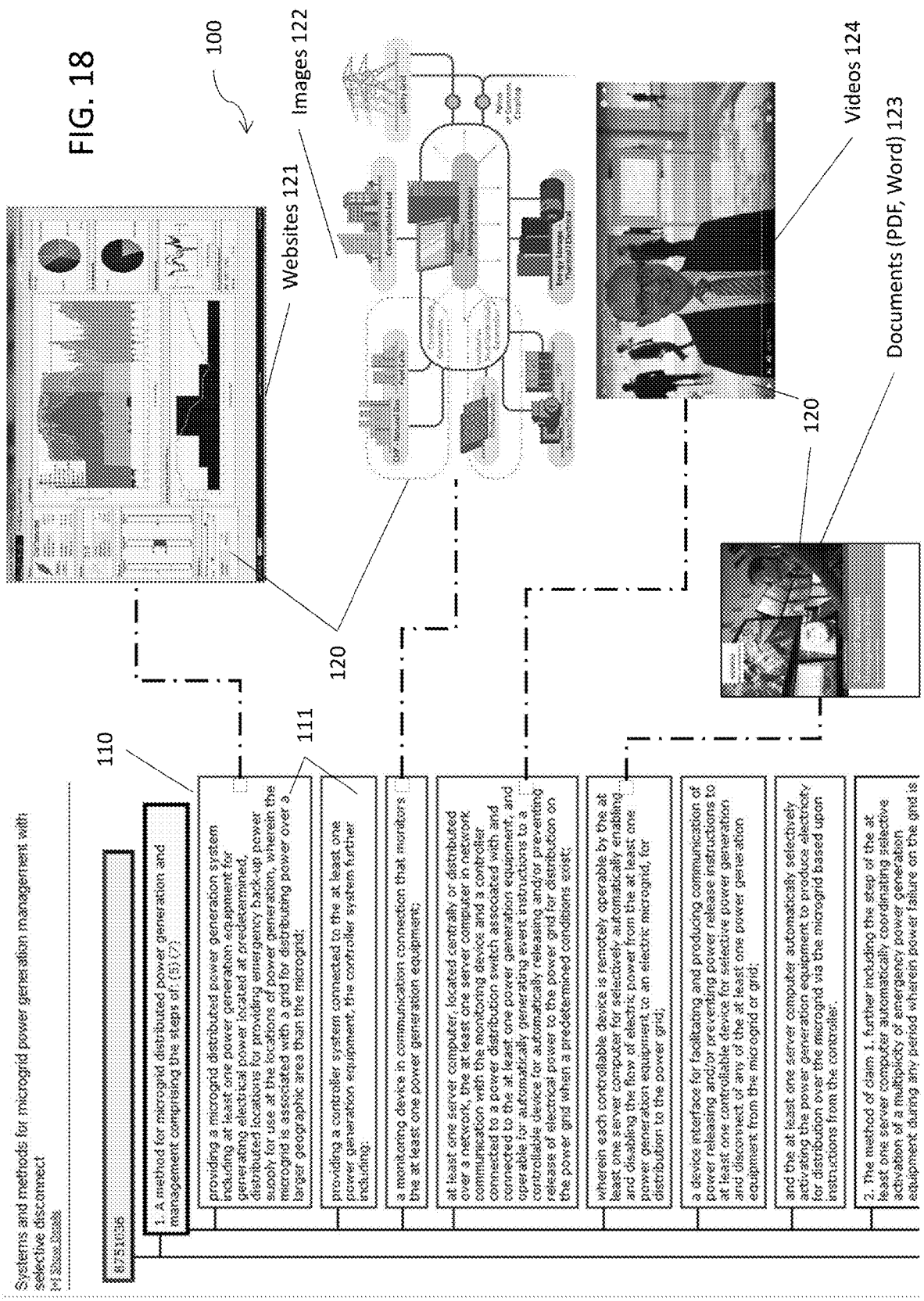
FIG. 18 is a user interface of a claims diagram with relevant technology content thumbnail images according to one embodiment of the present invention.

The present invention further provides for real-time, automated analysis of claims to assist in determining infringement by competitors in real-time or near-real-time. An interface provides a patent claims diagram as previously described with additional content of potential patent claims infringers shown diagrammatically connected to the claims elements and sub-elements. FIG. 18 illustrates an embodiment of this feature, showing a user interface, generally described as 100, with sub-elements 111 of a patent claims diagram 110 linked to matching technology content thumbnail images 120. The content is selected from at least one form of media, by way of example and not limitation, websites 121, images 122, documents (PDF, Word) 123, videos 124, product specifications, user manuals, advertisements, marketing collateral, competitive product comparisons and the like.

The present invention analyzes the elements or sub-elements and then searches in real-time for matching technology content. Once content is located, a semantics engine analyzes in real-time the meaning of the content to determine if it qualifies as matching technology content. Once it is determined to be matching technology content, the semantics engine determines in real-time if the purpose of the content meets the requirements of the study. By way of example and not limitation, the semantics engine would analyze the content and its context to determine if the content was an offer to sell, which would qualify as matching technology content, or a technology review article, which would not qualify.

Figure 19:
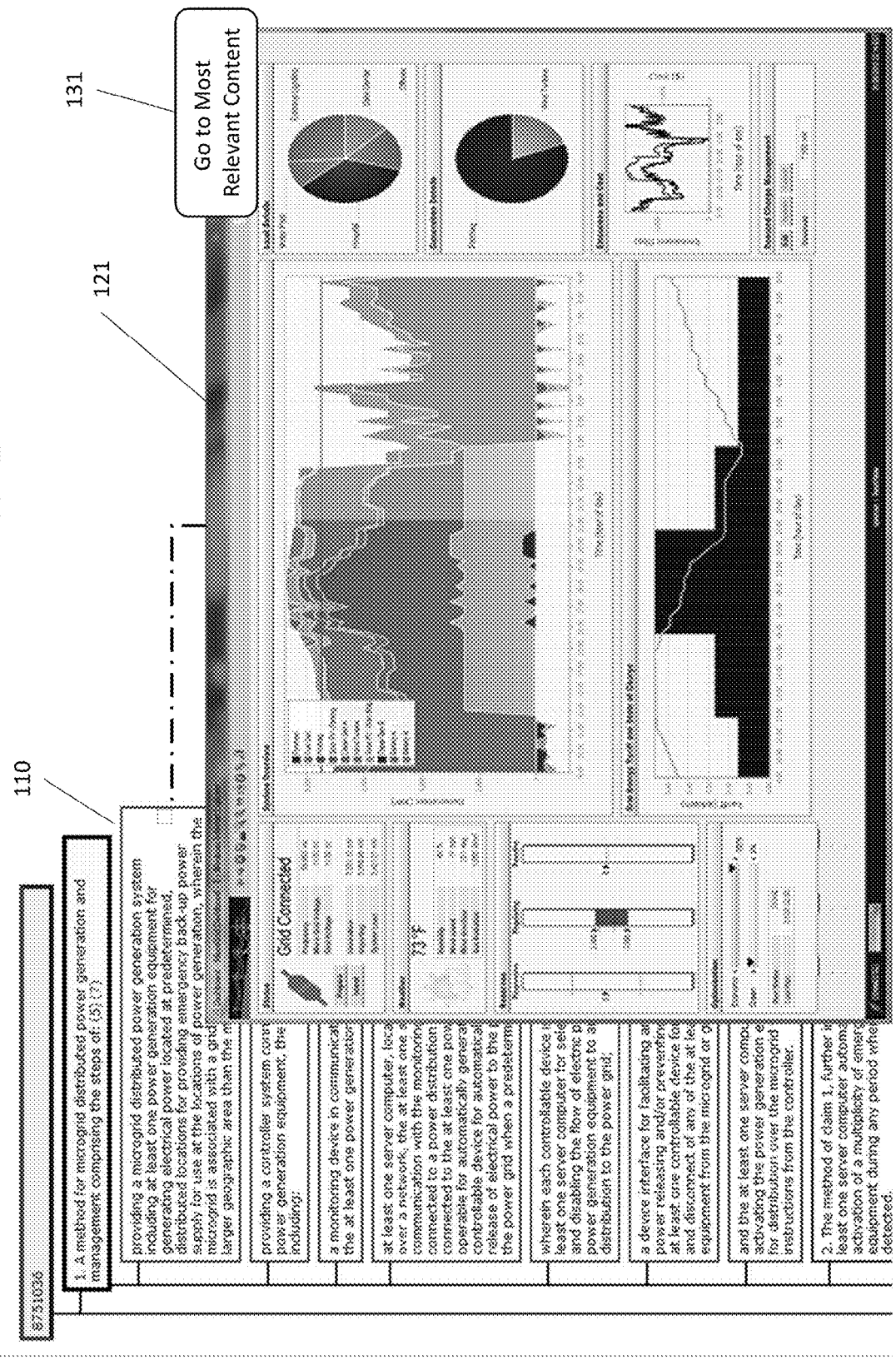
FIG. 19 is a user interface of a claims diagram and relevant technology content with a relevant technology content expanded for examination according to one embodiment of the present invention.
Figure 20:
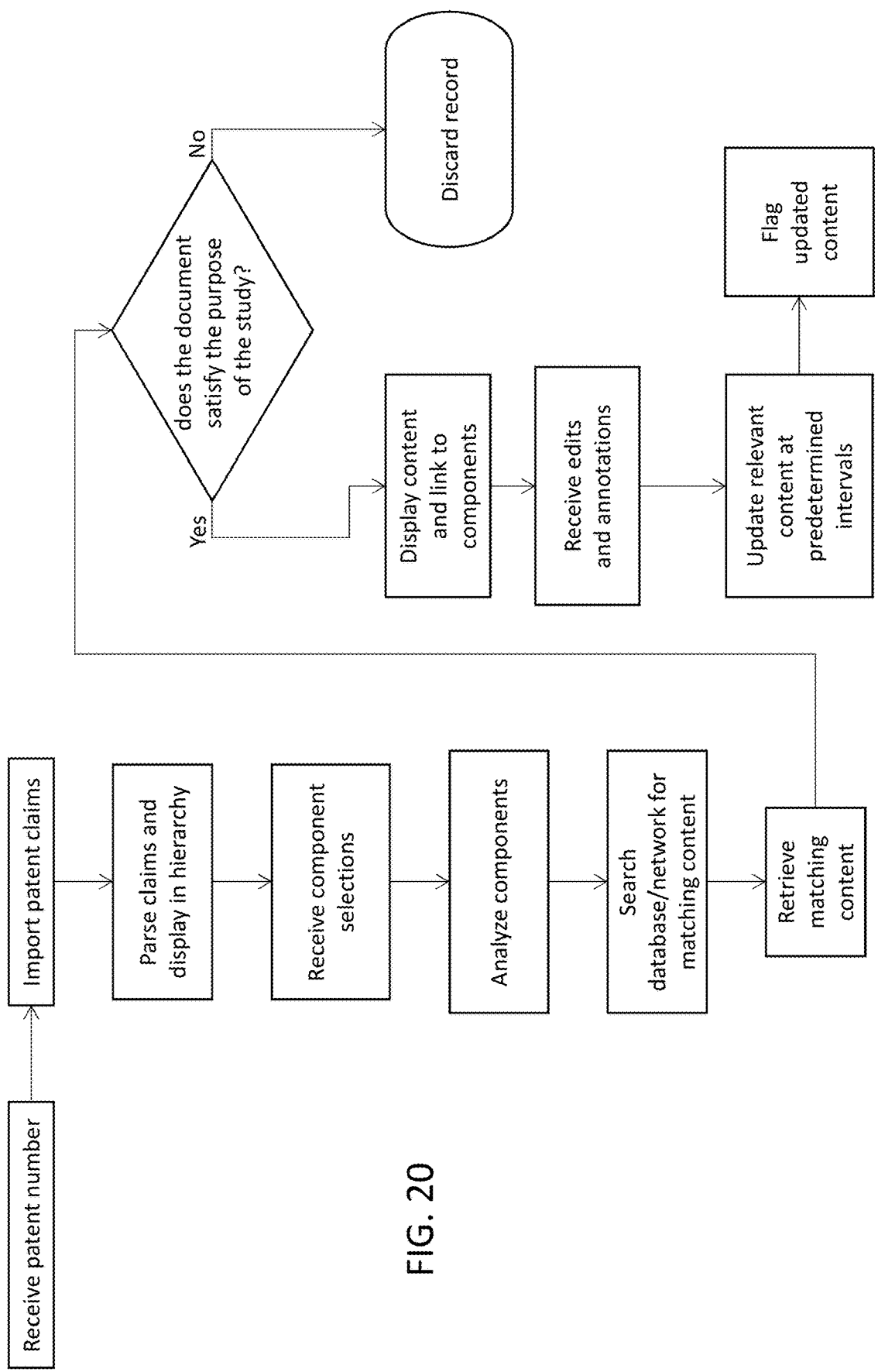
FIG. 20 is a flow diagram of a process according to one embodiment of the present invention.

Selecting a matching technology content thumbnail image brings the content to the foreground and expands it to fill the interface, to fill a predetermined pane in the interface, or to a predetermined size (FIG. 19). Preferably, the expanded content does not obscure the parent linked key component.

A method according to the present invention (FIG. 20) includes the steps of 1) receiving a patent number or other means of identification, 2) importing the patent claims, 3) parsing the claims and displaying them diagrammatically, 4) receive sub-element selections, 5) analyzing the selected sub-elements to determine keywords, 6) searching a database for matching technology content using the keywords, 7) retrieving matching technology content, 8) analyzing the retrieved content to determine if the record is relevant to the purpose of the study, 9) if relevant, displaying the matching technology content thumbnail images beside the patent claims diagram and linking the thumbnail images to the appropriate sub-element(s), and 10) periodically updating the search results for matching relevant content. If the retrieved record is not relevant, then the record is discarded. Additional steps include receiving edits and annotations to the diagram components.

Figure 21:
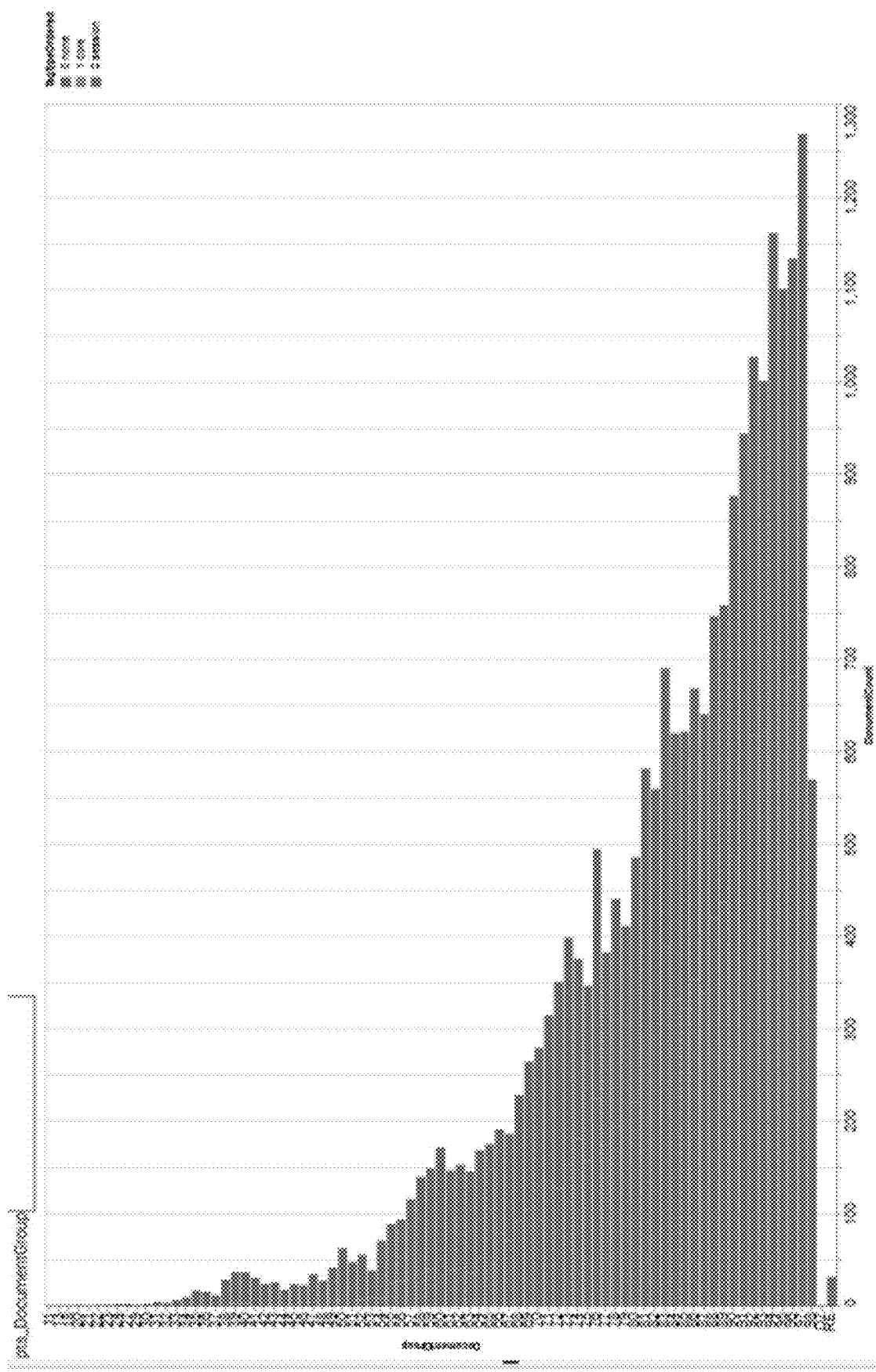
FIG. 21 shows a screen shot view according to one embodiment of the present invention.
Figure 22:
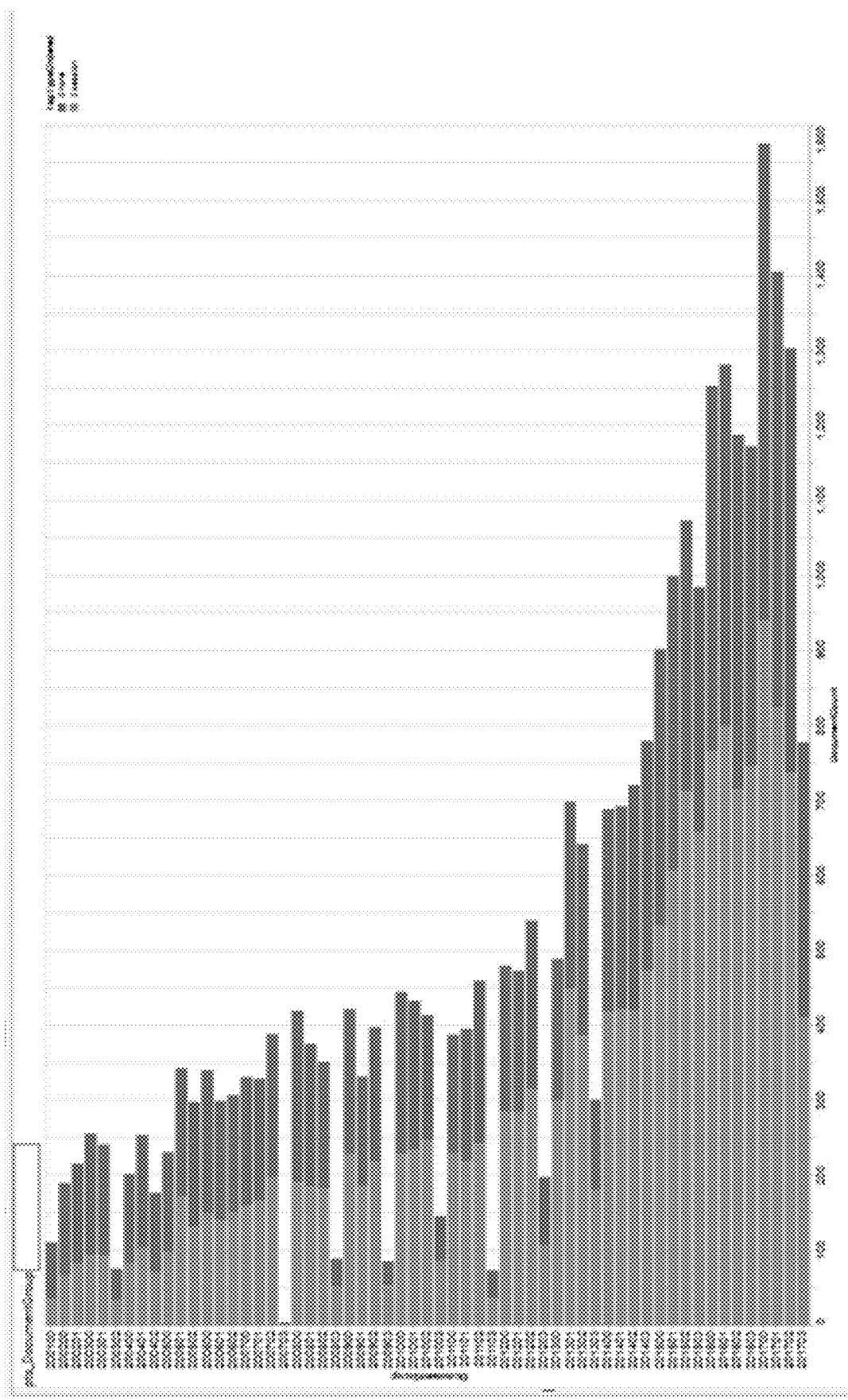
FIG. 22 shows another screen shot view according to one embodiment of the present invention.

FIG. 21 shows patents sorted by the first two digits of their document numbers. FIG. 22 shows publications sorted the by first six digits of their document numbers.

Note that the same content can satisfy the criteria for more than one sub-element, and therefore be linked to multiple sub-elements. In these cases, the system links a sub-element to the location in the document that is most relevant, based on semantic analysis of the sub-element.

The present invention is necessarily rooted in computer technology in order to overcome a problem specifically arising in the realm of computer networks. More specifically, the present invention electronically searches and parses, in real-time, millions of websites, documents, images and videos from around the planet to find the ones that are relevant. This immense amount of content, which cannot be parsed in real-time or near-real-time by humans, was not available prior to the advent of the Internet. Prior to the Internet, litigators would have to deal with hundreds or maybe thousands of documents per case, which required a large amount of time. Now, with the availability of millions of articles of content, there are not enough persons trained in litigation to review all the content in real-time or near-real-time. Thus, this is a problem created by the Internet that is addressed by the systems and methods of the present invention.

Additionally, the majority of these documents are only offered electronically and only through the Internet. Thus, it is not possible for users to search these documents except by using computer and electronic networking technology, including GUIs.

The GUIs described in the present invention are also a product of computer technology and Internet connectivity, and as such were unavailable before the Internet. Specifically, the sector interactive and dynamic visualization diagram provides for automatic expansion and collapse of data point within the sector according to a timeline or date range, as illustrated in the figures, in particular in FIGS. 1-3. Also, in the Patent Matrix hierarchical claims diagram displays and the expansion mechanisms, which are operable to expand dependent claims and dependent claim text were not available before computing technology and the Internet.

Additionally, the present method differs from prior art manual methods. Specifically, the present method first searches for technology keywords, and then determines if the document is relevant to the purpose of the study. In prior art manual methods, the searcher would first determine if a document was relevant to the purpose of the study, and then determine if the technology content in the document was relevant.

Furthermore, the high-throughput, real-time screening necessitated by the enormous number of documents along with the constraints of computer displays requires technological features that did not exist before the Internet. Specifically, the need to review multiple electronic documents in real-time within a fixed display requires an interactive method that can switch rapidly between documents. The dynamic, interactive and electronically linked GUIs described in the present invention provide this ability.

Certain modifications and improvements will occur to those skilled in the art upon a reading of the foregoing description. By way of example, the diagrams are preferably operable to provide for user annotation. Also, it is preferred that the diagrams are representable in a multiplicity of formats, depending upon user preference, such as .html. Also, electronic representations of the diagrams are electronically linked to the underlying documents from which the patent numbers were identified, for providing quick analysis or comparison between them. All modifications and improvements have been deleted herein for the sake of conciseness and readability but are properly within the scope of the following claims.

What is claimed is:

1. A system for interactive patent visualization, comprising:
   at least one user device constructed and configured for network communication with at least one server platform;
   wherein the at least one server platform is operable to provide an interactive and dynamic graphical user interface (GUI) to the at least one user device;
   wherein the at least one server platform comprises an intelligence engine including an artificial intelligence (AI) model;
   wherein the at least one server platform is operable to access at least one national patent database and a multiplicity of market related databases;
   wherein the at least one server platform is operable to generate a patent forecast diagram based on patent data from the at least one national patent database, wherein the patent forecast diagram comprises a multiplicity of graphics distributed over time and by a multiplicity of categories, representing a distribution of patent documents for a predetermined technology sector over time, wherein each graphic represents a patent document;
   wherein the patent forecast diagram comprises a multiplicity of graphics distributed over time and by a multiplicity of categories, representing a distribution of patent documents for a predetermined technology sector over time, wherein each graphic represents a patent document;
   wherein each of the multiplicity of categories comprises a multiplicity of sub-categories;
   wherein each of the multiplicity of sub-categories comprises one of a multiplicity of category labels;
   wherein the at least one user device is operable to tag a multiplicity of patent documents with one of the multiplicity of category labels;
   wherein the server platform is operable to group the multiplicity of patent documents by the multiplicity of category labels on the patent forecast diagram;
   wherein the server platform is operable to generate a visual representation of market information including news articles, press releases, product announcements, and professional opinion articles for the predetermined technology sector;
   wherein the at least one user device is operable to display the patent forecast diagram and the visual representation of market information via the interactive and dynamic GUI;
   wherein the at least one server platform is operable to train the AI model based on text of the multiplicity of patent documents tagged with one of the multiplicity of category labels by the at least one user device;
   wherein the at least one user device is operable to display the patent forecast diagram via the interactive and dynamic GUI;
   wherein the at least one user device is operable to provide for click-selection of one of the multiplicity of graphics and display related patent data represented by the click-selected one of the multiplicity of graphics; and
   wherein the patent forecast diagram is a radial plot diagram with the multiplicity of patent documents distributed from the origin to the extent of the radial plot diagram by time, and wherein the multiplicity of patent documents are circumferentially grouped based on the multiplicity of category labels.

2. The system of claim 1, wherein the intelligence engine is operable to automatically tag the multiplicity of patent documents with one of the multiplicity of category labels based on patent document information including claim text, abstract text, activity dates, Cooperative Patent Classification (CPC) codes, and metadata.

3. The system of claim 1, wherein the size of each graphic represents a length of the patent document.

4. The system of claim 1, wherein the multiplicity of graphics comprises at least one geometric shape, and wherein the at least one geometric shape comprises at least one circle.

5. The system of claim 4, wherein the at least one circle comprises a filled circle representing an issued patent document.

6. The system of claim 4, wherein the at least one circle comprises an unfilled circle representing a published patent application.

7. A system for interactive patent visualization, comprising:
   at least one user device constructed and configured for network communication with a server platform;
   wherein the server platform is operable to provide an interactive and dynamic graphical user interface (GUI) to the at least one user device;
   wherein the server platform is operable to access at least one national patent database and a multiplicity of market related databases;
   wherein the server platform is operable to generate a patent forecast diagram based on patent data from the at least one national patent database, wherein the patent forecast diagram comprises a multiplicity of graphics distributed over time and by a multiplicity of categories, representing a distribution of patent documents for a predetermined technology sector over time, wherein each graphic represents a patent document;
   wherein each of the multiplicity of categories are associated with one of a multiplicity of category labels;
   wherein the at least one user device is operable to tag a multiplicity of patent documents with one of the multiplicity of category labels;
   wherein the server platform is operable to group the multiplicity of patent documents by the multiplicity of category labels on the patent forecast diagram;
   wherein the server platform is operable to generate a visual representation of market information including news articles, press releases, product announcements, and professional opinion articles for the predetermined technology sector;
   wherein the at least one user device is operable to display the patent forecast diagram and the visual representation of market information via the interactive and dynamic GUI;

wherein the at least one user device is operable to click-select one of the multiplicity of graphics and display related patent data represented by the click-selected one of the multiplicity of graphics; and wherein the patent forecast diagram is a radial plot diagram with the multiplicity of patent documents distributed from the origin to the extent of the radial plot diagram by time, and wherein the multiplicity of patent documents are circumferentially grouped based on the multiplicity of category labels.

8. The system of claim 7, wherein the server platform is operable to search and retrieve the market information from the multiplicity of market related databases.

9. The system of claim 7, wherein the server platform comprises an intelligence engine including a machine learning model operable to automatically curate and prioritize the market information based upon a relevancy value and a recency value for the predetermined technology sector.

10. The system of claim 7, wherein the market information includes electronic documents or data elements having automatic links directly to a company web site hosted on the internet, real time stock status and price for public companies.

11. A method for interactive patent visualization, comprising:

providing at least one user device constructed and configured for network communication with at least one server platform, wherein the at least one server platform comprises an intelligence engine including an artificial intelligence (AI) model, wherein the at least one server platform provides an interactive and dynamic graphical user interface (GUI) to the at least one user device;

the at least one server platform accessing at least one national patent database and a multiplicity of market related databases;

the at least one server platform automatically generating a patent forecast diagram based on patent data from the at least one national patent database, wherein the patent forecast diagram comprises a multiplicity of graphics distributed over time and by a multiplicity of categories, representing a distribution of patent documents for a predetermined technology sector over time, wherein each graphic represents a patent document;

wherein each of the multiplicity of categories are associated with one of a multiplicity of category labels;

the at least one user device tagging a multiplicity of patent documents with one of the multiplicity of category labels;

wherein the server platform is operable to group the multiplicity of patent documents by the multiplicity of category labels on the patent forecast diagram;

wherein the server platform is operable to generate a visual representation of market information including news articles, press releases, product announcements, and professional opinion articles for the predetermined technology sector;

wherein the at least one user device is operable to display the patent forecast diagram and the visual representation of market information via the interactive and dynamic GUI;

the at least one server platform training the AI model based on text of the multiplicity of patent documents tagged with the at least one category label by the at least one user device;

the at least one user device displaying the patent forecast diagram via the interactive and dynamic GUI;

the at least one user device click-selecting one of the multiplicity of graphics and displaying related patent data represented by the click-selected one of the multiplicity of graphics;

the at least one server platform automatically, periodically retrieving new patent data from the at least one national database and updating the multiplicity of patent documents by adding new patent documents to the multiplicity of patent documents based on the new patent data; and wherein the patent forecast diagram is a radial plot diagram with the multiplicity of patent documents distributed from the origin to the extent of the radial plot diagram by time, and wherein the multiplicity of patent documents are circumferentially grouped based on the at least one category label.

12. The method of claim 11, wherein the patent forecast diagram is a radial plot diagram with the multiplicity of patent documents distributed from the origin to the extent of the radial plot diagram by time.

13. The method of claim 11, further comprising the intelligence engine automatically tagging a second multiplicity of patent documents with the at least one category label.

14. The method of claim 11, further comprising the intelligence engine automatically searching, retrieving, curating and prioritizing market information from a multiplicity of market related databases based upon a relevancy value and a recency value for the predetermined technology sector.

15. The method of claim 14, further comprising the at least one server platform automatically generating a visual representation of the market information, and the at least one user device displaying the visual representation of the market information via the interactive and dynamic GUI.

16. The method of claim 14, further comprising the at least one server platform providing insights for the predetermined sector based on the patent data and the market information.

17. The system of claim 1, wherein the at least one server platform is operable to group the multiplicity of patent documents by the multiplicity of categories or by the multiplicity of subcategories on the patent forecast diagram, and wherein the dynamic GUI is operable to allow the patent forecast diagram to alternate between grouping the multiplicity of patent documents by the multiplicity of categories or by the multiplicity of subcategories.

18. The system of claim 7, wherein the multiplicity of category labels are not Cooperative Patent Classification (CPC) codes.

* * * * *